US012695566B2

(12) United States Patent
Huang et al.

(10) Patent No.: US 12,695,566 B2
(45) Date of Patent: Jul. 28, 2026

(54) SOUNDING REFERENCE SIGNAL (SRS) FREQUENCY HOPPING FOR DISTRIBUTED ANTENNA PORT MAPPING

(71) Applicant: QUALCOMM Incorporated, San Diego, CA (US)

(72) Inventors: Yi Huang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/521,598

(22) Filed: Nov. 28, 2023

(65) Prior Publication Data

US 2024/0340130 A1 Oct. 10, 2024

Related U.S. Application Data

(60) Provisional application No. 63/494,335, filed on Apr. 5, 2023.

(51) Int. Cl.
H04L 5/00 (2006.01)

(52) U.S. Cl.
CPC .......... H04L 5/0048 (2013.01); H04L 5/0012 (2013.01)

(58) Field of Classification Search
CPC ... H04L 5/0048; H04L 5/0012; H04L 5/0023; H04L 5/0051; H04L 5/0053
See application file for complete search history.

(56) References Cited

U.S. PATENT DOCUMENTS

| | | | | |
|---|---|---|---|---|
| 2016/0119100 A1* | 4/2016 | Chung | .............. | H04W 72/0453 370/329 |
| 2020/0287684 A1 | 9/2020 | Shin et al. | | |
| 2025/0286762 A1* | 9/2025 | Sun | ....................... | H04L 5/0026 |

FOREIGN PATENT DOCUMENTS

| | | | | |
|---|---|---|---|---|
| EP | 4138325 A1 | 2/2023 | | |
| WO | WO-2022139847 A1 * | 6/2022 | ........... | H04L 5/0091 |

OTHER PUBLICATIONS

3GPP TSG RAN WG1 Meeting#48bis, R1-071462 Title:Channel quality Reporting rate for Enhanced Cell_FACH (Year: 2007).*
3GPP TSG RAN WG1 Meeting#84, R1-160422 Title:On the need to support PUCCH for eLAA (Year: 2016).*
International Search Report and Written Opinion—PCT/US2024/016167—ISA/EPO—Jun. 25, 2024.
(Continued)

*Primary Examiner* — Faruk Hamza
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating a sounding reference signal (SRS) resource set that includes an SRS resource, the SRS resource associated with multiple antenna ports having a distributed mapping to multiple orthogonal frequency division multiplexing (OFDM) symbols of the SRS resource. The UE may transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols. Numerous other aspects are described.

30 Claims, 17 Drawing Sheets

700 →

(56) References Cited

OTHER PUBLICATIONS

Qualcomm Incorporated: "SRS Enhancement for TDD CJT and 8 Tx Operation", 3GPP TSG RAN WG1 #113, R1-2305322, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 21, 2023, pp. 1-14, XP052394158, the whole document.
3GPP: "3rd Generation Partnership Project, Technical Specification Group Radio Access Network, NR, Physical Channels and Modulation (Release 17)", 3GPP TS 38.211, V17.4.0, Dec. 2022, pp. 1-132, Sections 6.4.1.4.2 and 6.4.1.4.3.

* cited by examiner

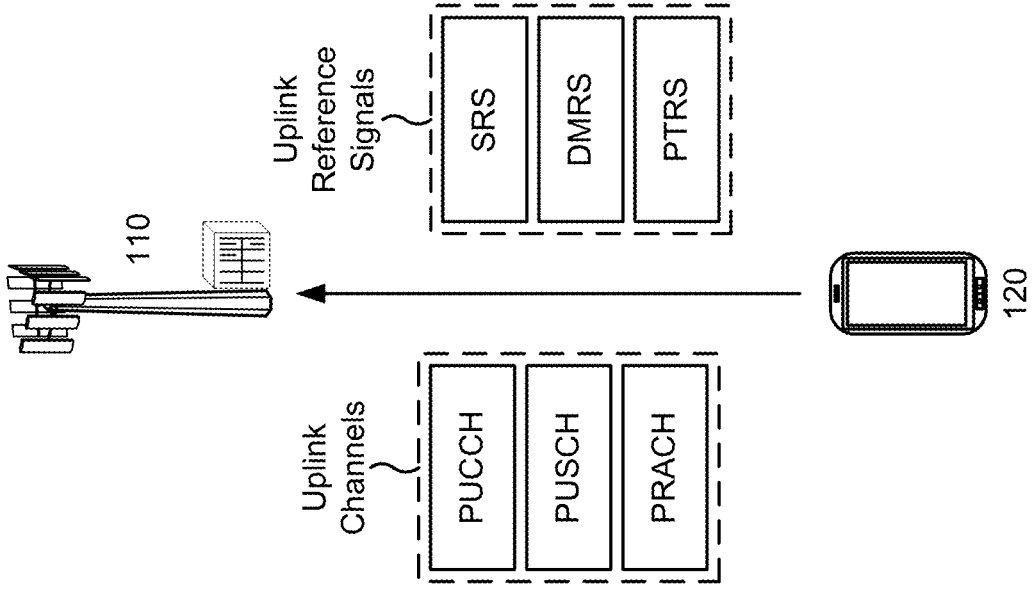
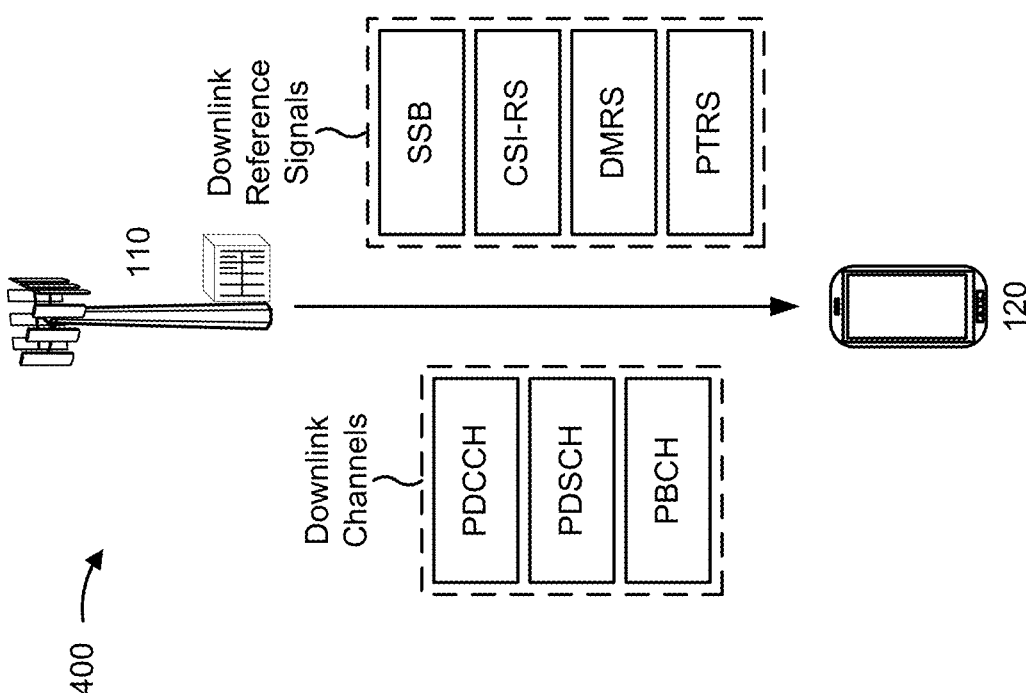
FIG. 4

700

UE

Network Node

705
Capabilities report

710
Configuration information (e.g., indicating an SRS resource associated with multiple antenna ports having a distributed mapping to multiple OFDM symbols)

715
Indication to activate SRS resource

720
SRSs on multiple antenna ports in multiple OFDM symbols in a single frequency hop of a frequency hopping pattern

900

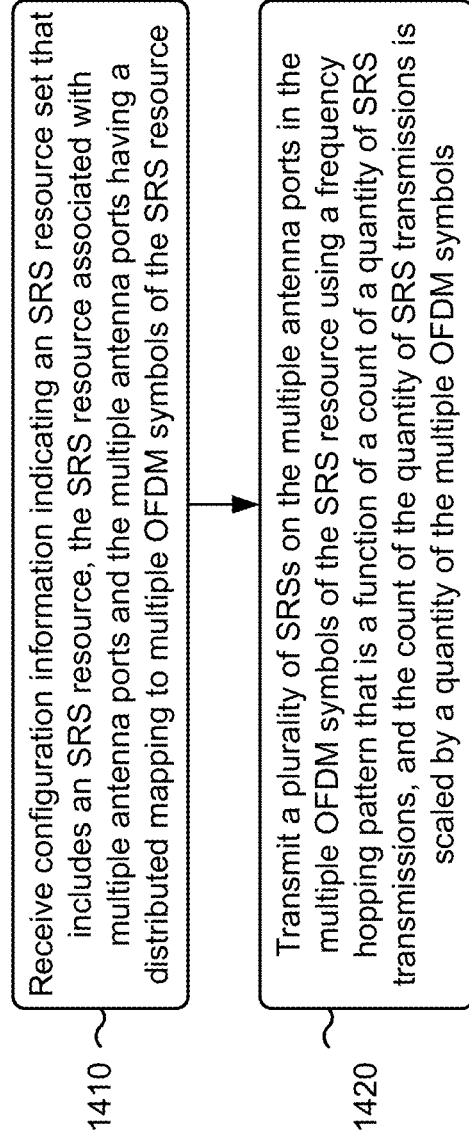

Receive configuration information indicating an SRS resource set that includes an SRS resource, the SRS resource associated with multiple antenna ports and the multiple antenna ports having a distributed mapping to multiple OFDM symbols of the SRS resource

1410

Transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols

1420

1400

FIG. 14

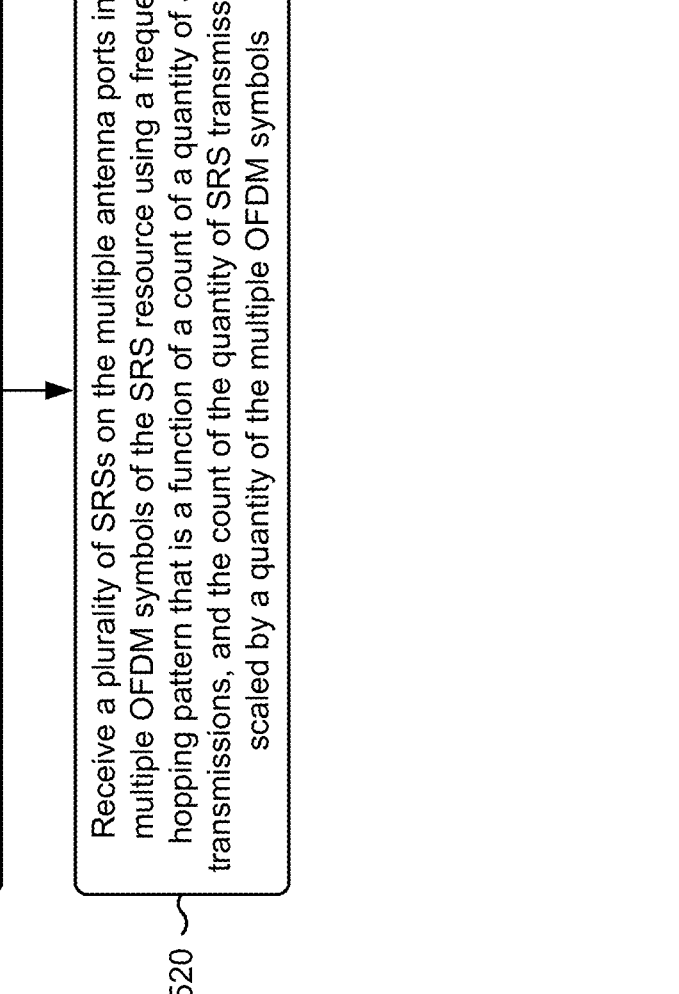

Transmit configuration information indicating an SRS resource set that includes an SRS resource, the SRS resource associated with multiple antenna ports and the multiple antenna ports having a distributed mapping to multiple OFDM symbols of the SRS resource

1510

Receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols

SOUNDING REFERENCE SIGNAL (SRS) FREQUENCY HOPPING FOR DISTRIBUTED ANTENNA PORT MAPPING

CROSS-REFERENCE TO RELATED APPLICATION

This Patent Application claims priority to U.S. Provisional Patent Application No. 63/494,335, filed on Apr. 5, 2023, entitled "SOUNDING REFERENCE SIGNAL (SRS) FREQUENCY HOPPING FOR DISTRIBUTED ANTENNA PORT MAPPING," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for sounding reference signal (SRS) frequency hopping for distributed antenna port mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource. The one or more processors may be configured to transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to an apparatus for wireless communication at a network node. The apparatus may include a memory and one or more processors coupled to the memory. The one or more processors may be configured to transmit configuration information indicating an SRS resource set that includes an SRS resource, the SRS resource associated with multiple antenna ports and the multiple antenna ports having a distributed mapping to multiple OFDM symbols of the SRS resource. The one or more processors may be configured to receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to a method of wireless communication performed by a UE. The method may include receiving configuration information indicating an SRS resource set that includes an SRS resource, the SRS resource associated with multiple antenna ports and the multiple antenna ports having a distributed mapping to multiple OFDM symbols of the SRS resource. The method may include transmitting a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to a method of wireless communication performed by a network node. The method may include transmitting configuration information indicating an SRS resource set that includes an SRS resource, the SRS resource associated with multiple antenna ports and the multiple antenna ports having a distributed mapping to multiple OFDM symbols of the SRS resource. The method may include receiving a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to a non-transitory computer-readable medium that stores a set of instructions for wireless communication by a UE. The set of instructions, when executed by one or more processors of the UE, may cause the UE to receive configuration information indicating an SRS resource set that includes an SRS resource, the SRS resource associated with multiple antenna ports and the multiple antenna ports having a distributed mapping to multiple OFDM symbols of the SRS resource. The set of instructions, when executed by one or more processors of the UE, may cause the UE to transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to a non-transitory computer-readable medium that stores a set of instructions for wireless communication by a network node. The set of instructions, when executed by one or more processors of the network node, may cause the network node to transmit configuration information indicating an SRS resource set that includes an SRS resource, the SRS resource associated with multiple antenna ports and the multiple antenna ports having a distributed mapping to multiple OFDM symbols of the SRS resource. The set of instructions, when executed by one or more processors of the network node, may cause the network node to receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to an apparatus for wireless communication. The apparatus may include means for receiving configuration information indicating an SRS resource set that includes an SRS resource, the SRS resource associated with multiple antenna ports and the multiple antenna ports having a distributed mapping to multiple OFDM symbols of the SRS resource. The apparatus may include means for transmitting a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Some aspects described herein relate to an apparatus for wireless communication. The apparatus may include means for transmitting configuration information indicating an SRS resource set that includes an SRS resource, the SRS resource associated with multiple antenna ports and the multiple antenna ports having a distributed mapping to multiple OFDM symbols of the SRS resource. The apparatus may include means for receiving a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 14 is a diagram illustrating an example process performed, for example, by a UE, in accordance with the present disclosure.

FIG. 15 is a diagram illustrating an example process performed, for example, by a network node, in accordance with the present disclosure.

DETAILED DESCRIPTION

Figure 1:
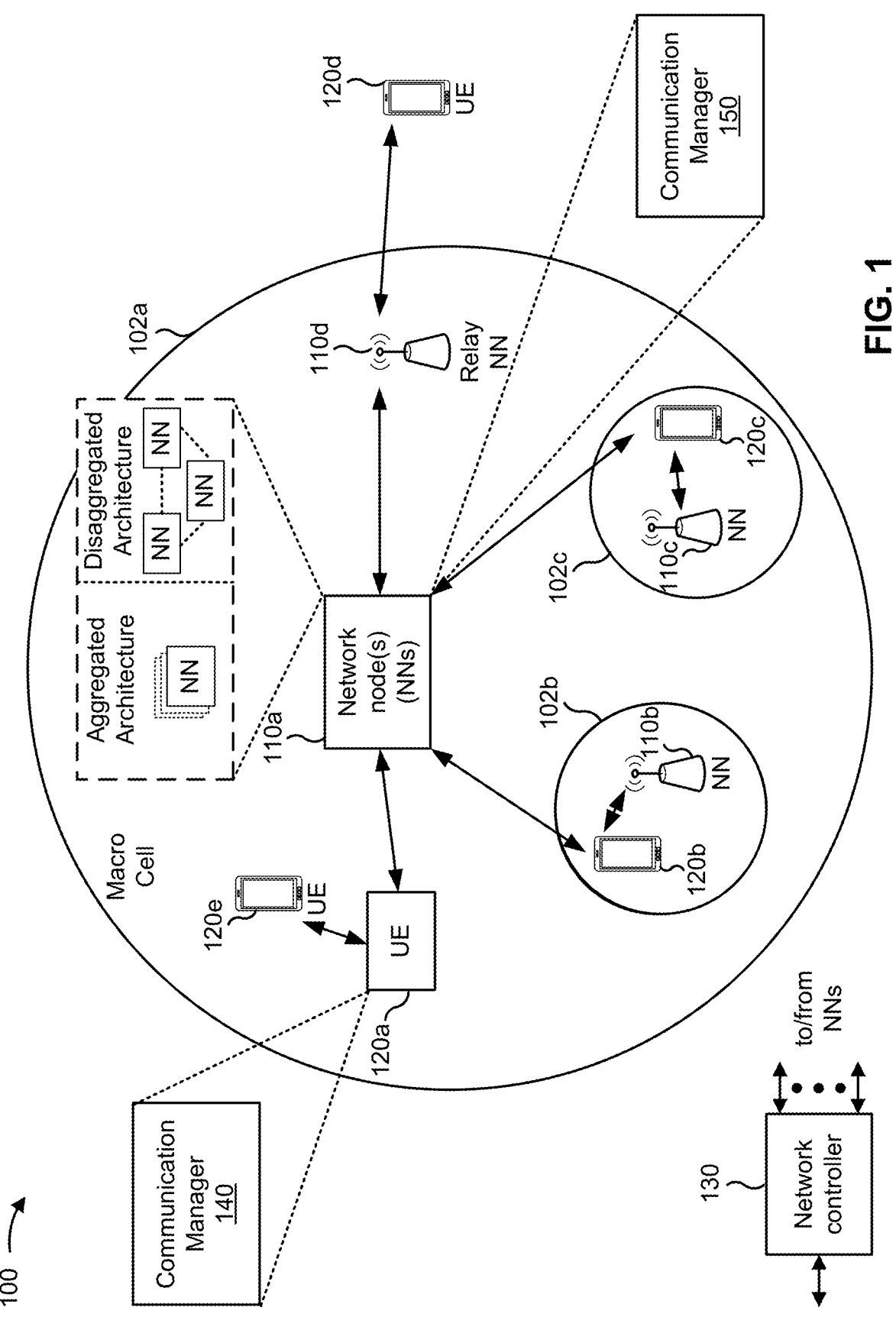
FIG. 1 is a diagram illustrating an example of a wireless network, in accordance with the present disclosure.

A user equipment (UE) may be configured with a sounding reference signal (SRS) resource that is associated with one or more antenna ports. SRS transmissions may use frequency hopping using subband SRSs to sweep a larger bandwidth in multiple orthogonal frequency division multiplexing (OFDM) symbols. In legacy operation, antenna ports may be sounded simultaneously in a single OFDM symbol. Thus, in frequency hopping, all antenna ports for SRS transmissions frequency hop together. However, in some examples, multiple antenna ports (e.g., eight antenna ports) may have a distributed mapping to multiple OFDM symbols (e.g., two, four, or eight OFDM symbols). Here, a single OFDM symbol is mapped to only a subset of the multiple antenna ports. Accordingly, frequency hopping on a per-symbol basis will result in less than all of the antenna ports being sounded in each frequency hop. As a result, the SRS transmissions of the UE may be less robust, thereby impacting uplink channel estimation used for scheduling, link adaptation, precoder selection, or beam management, among other examples, that use measurement of the SRS transmissions.

Some techniques and apparatuses described herein enable frequency hopping for SRS transmissions on antenna ports having a distributed mapping to multiple OFDM symbols of an SRS resource. A frequency hopping pattern for the frequency hopping may be determined as a function of a count of a quantity of SRS transmissions that have occurred. In some aspects, a UE may transmit SRSs on the multiple antenna ports in multiple OFDM symbols of the SRS resource (e.g., according to the distributed mapping) in a single frequency hop of a frequency hopping pattern. This may be achieved by treating the multiple OFDM symbols as a single OFDM symbol (e.g., a single unit) in connection with counting SRS transmissions. Moreover, for SRS repetition in the SRS resource, a UE may transmit SRSs on the multiple antenna ports in first multiple OFDM symbols of the SRS resource (e.g., according to the distributed mapping), and one or more repetitions of the SRSs on the multiple antenna ports in second multiple OFDM symbols of the SRS resource (e.g., according to the distributed mapping), in a single frequency hop of a frequency hopping pattern. This may be achieved by treating the first multiple OFDM symbols and the second multiple OFDM symbols as a single OFDM symbol (e.g., a single unit) in connection with counting SRS transmissions.

In this way, SRS transmissions on all of the multiple antenna ports may be performed in each frequency hop. Accordingly, the SRS transmissions are diverse in a time domain and a frequency domain, thereby improving uplink channel estimation used for scheduling, link adaptation, precoder selection, or beam management, among other examples, that use measurement of the SRS transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

As used herein, the network node 110 "outputting" or "transmitting" a communication to the UE 120 may refer to a direct transmission (e.g., from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (e.g., triggering transmission of a physical layer reference signal). Similarly, the UE 120 "transmitting" a communication to the network node 110 may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (e.g., from the UE 120 to the network node 110) or receiving the communication (or information derived from reception of the communication) via one or more other network nodes or devices.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating an SRS resource set that includes an SRS resource, the SRS resource associated with multiple antenna ports and the multiple antenna ports having a distributed mapping to multiple OFDM symbols of the SRS resource; and transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols. Additionally, or alternatively, the communication manager 140 may perform one or more other operations described herein.

In some aspects, the network node 110 may include a communication manager 150. As described in more detail elsewhere herein, the communication manager 150 may transmit configuration information indicating an SRS resource set that includes an SRS resource, the SRS resource associated with multiple antenna ports and the multiple antenna ports having a distributed mapping to multiple OFDM symbols of the SRS resource; and receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols. Additionally, or alternatively, the communication manager 150 may perform one or more other operations described herein.

As indicated above, FIG. 1 is provided as an example. Other examples may differ from what is described with regard to FIG. 1.

Figure 2:
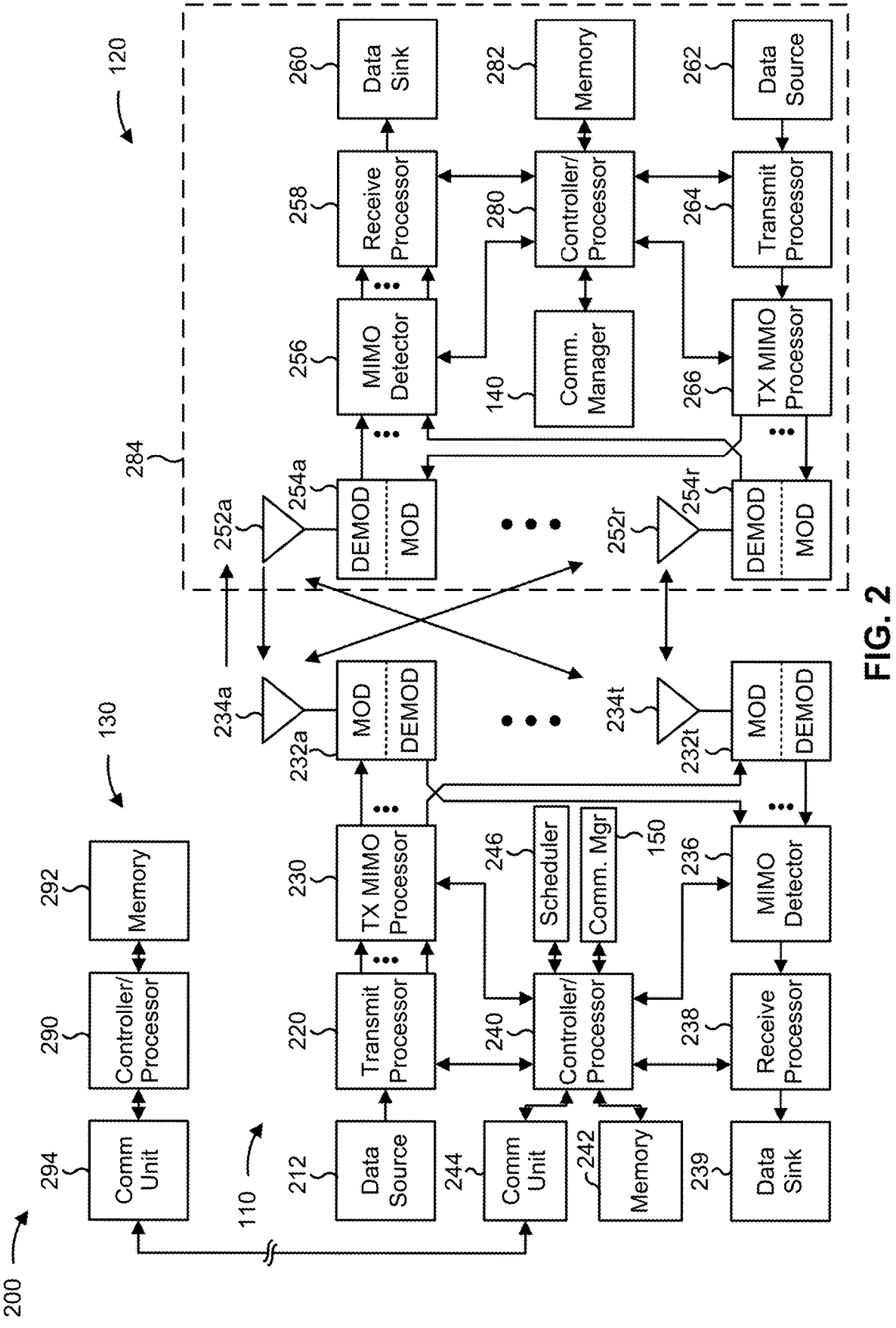
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., Toutput symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-17).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-17).

The controller/processor 240 of the network node 110, the controller/processor 280 of the UE 120, and/or any other component(s) of FIG. 2 may perform one or more techniques associated with SRS frequency hopping for distributed antenna port mapping, as described in more detail elsewhere herein. For example, the controller/processor 240 of the network node 110, the controller/processor 280 of the UE 120, and/or any other component(s) of FIG. 2 may perform or direct operations of, for example, process 1400 of FIG. 14, process 1500 of FIG. 15, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE (e.g., the UE 120) includes means for receiving configuration information indicating an SRS resource set that includes an SRS resource, the SRS resource associated with multiple antenna ports and the multiple antenna ports having a distributed mapping to multiple OFDM symbols of the SRS resource; and/or means for transmitting a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node (e.g., the network node 110) includes means for transmitting configuration information indicating an SRS resource set that includes an SRS resource, the SRS resource associated with multiple antenna ports and the multiple antenna ports having a distributed mapping to multiple OFDM symbols of the SRS resource; and/or means for receiving a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
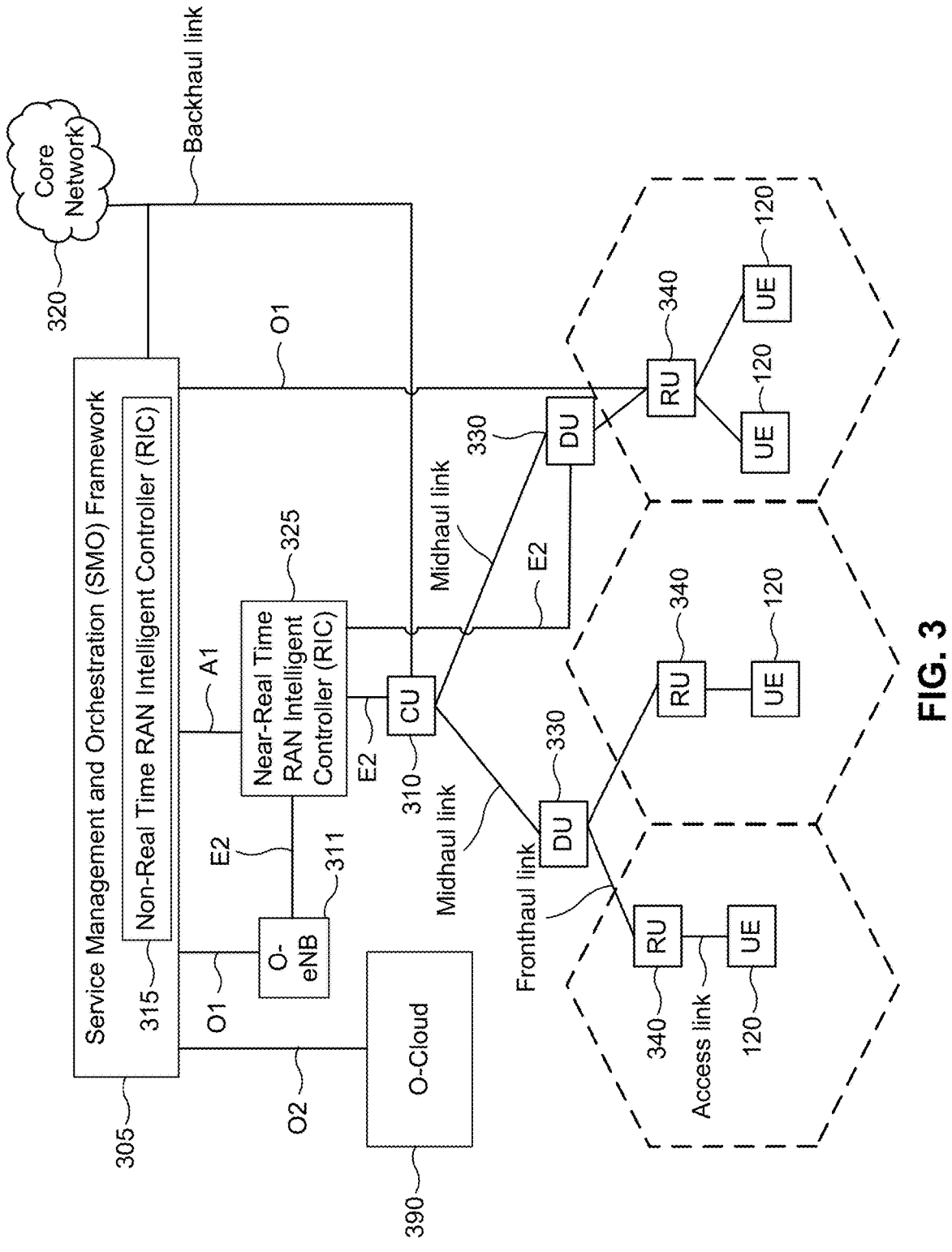
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
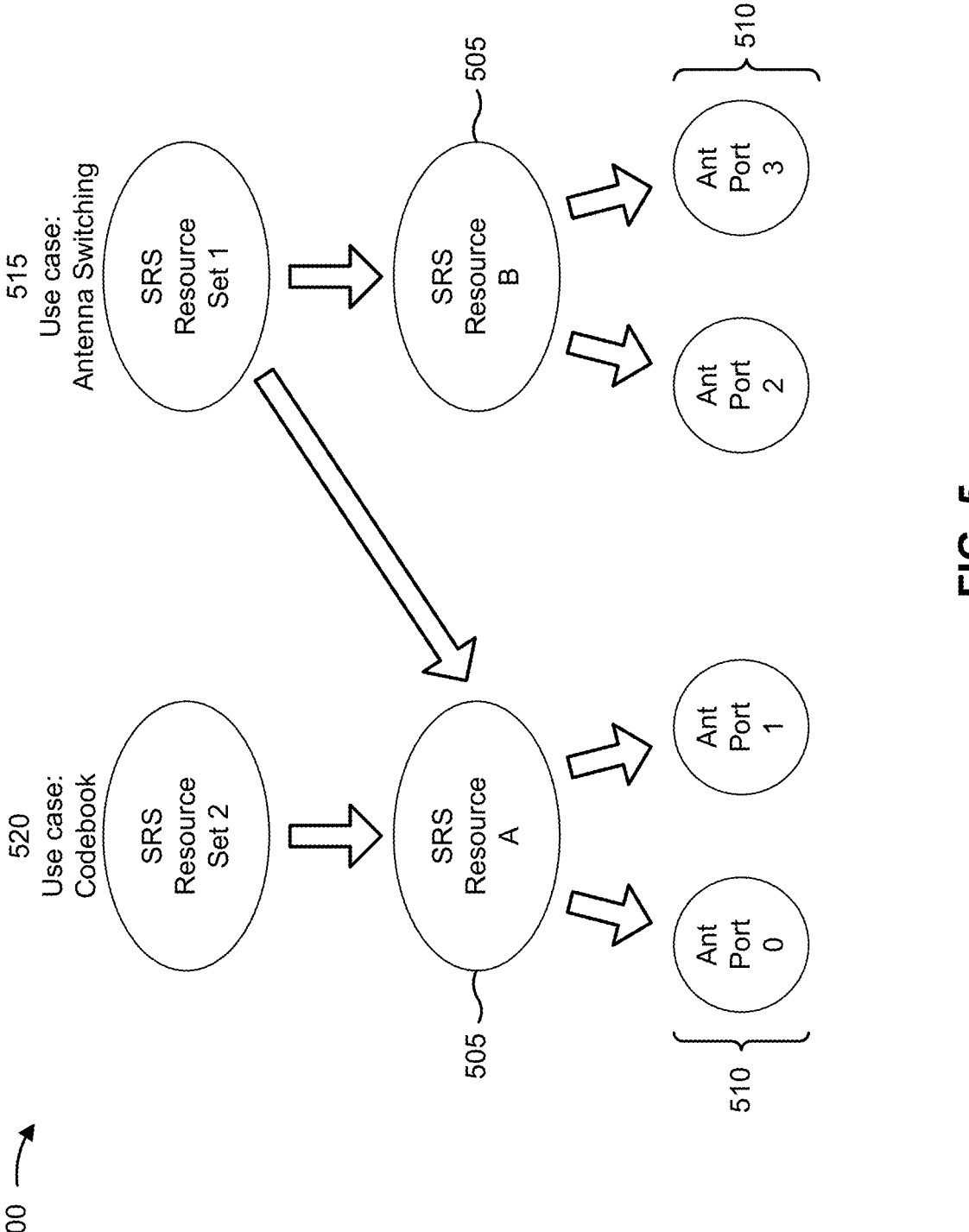
FIG. 5 is a diagram illustrating an example of sounding reference signal (SRS) resource sets, in accordance with the present disclosure.

FIG. 5 is a diagram illustrating an example 500 of SRS resource sets, in accordance with the present disclosure.

A UE 120 may be configured with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 505, an SRS resource set may include one or more resources (e.g., shown as SRS resources), which may include time resources and/or frequency resources (e.g., a slot, a symbol, a resource block, and/or a periodicity for the time resources).

As shown by reference number 510, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna port may represent some combination of physical antennas of the UE 120 and/or channels. In some cases, the UE 120 may not have knowledge of the channels associated with the physical antennas, and may operate based on knowledge of the channels associated with antenna ports. An antenna port may be defined such that a channel, over which a symbol on the antenna port is conveyed, can be inferred from a channel over which another symbol on the same antenna port is conveyed.

An antenna switching SRS resource set may be used to indicate downlink CSI with reciprocity between an uplink and downlink channel. For example, when there is reciprocity between an uplink channel and a downlink channel, a network node 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a network node 110 indicates an uplink precoder to the UE 120. For example, when the network node 110 is configured to indicate an uplink precoder to the UE 120 (e.g., using a precoder codebook), the network node 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the network node 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the network node 110 indicating an uplink precoder to be used by the UE 120). For example, when the UE 120 is configured to select an uplink precoder, the network node 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the network node 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, 4, or 8). The UE 120 may be configured with X SRS ports (e.g., where X≤8). In some examples, the X SRS ports may have a distributed mapping to multiple of the N symbols of the SRS resource, as described herein.

As shown in FIG. 5, in some aspects, different SRS resource sets indicated to the UE 120 (e.g., having different use cases) may overlap (e.g., in time and/or in frequency, such as in the same slot). For example, as shown by reference number 515, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 520, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As used herein, "slot" may refer a portion of a radio frame (or a subframe) within an LTE, 5G, or other wireless communication structure. In some aspects, a slot may include one or more symbols. Moreover, "symbol" may refer to an OFDM symbol or another similar symbol within a slot.

As indicated above, FIG. 5 is provided as an example. Other examples may differ from what is described with regard to FIG. 5.

Figure 6:
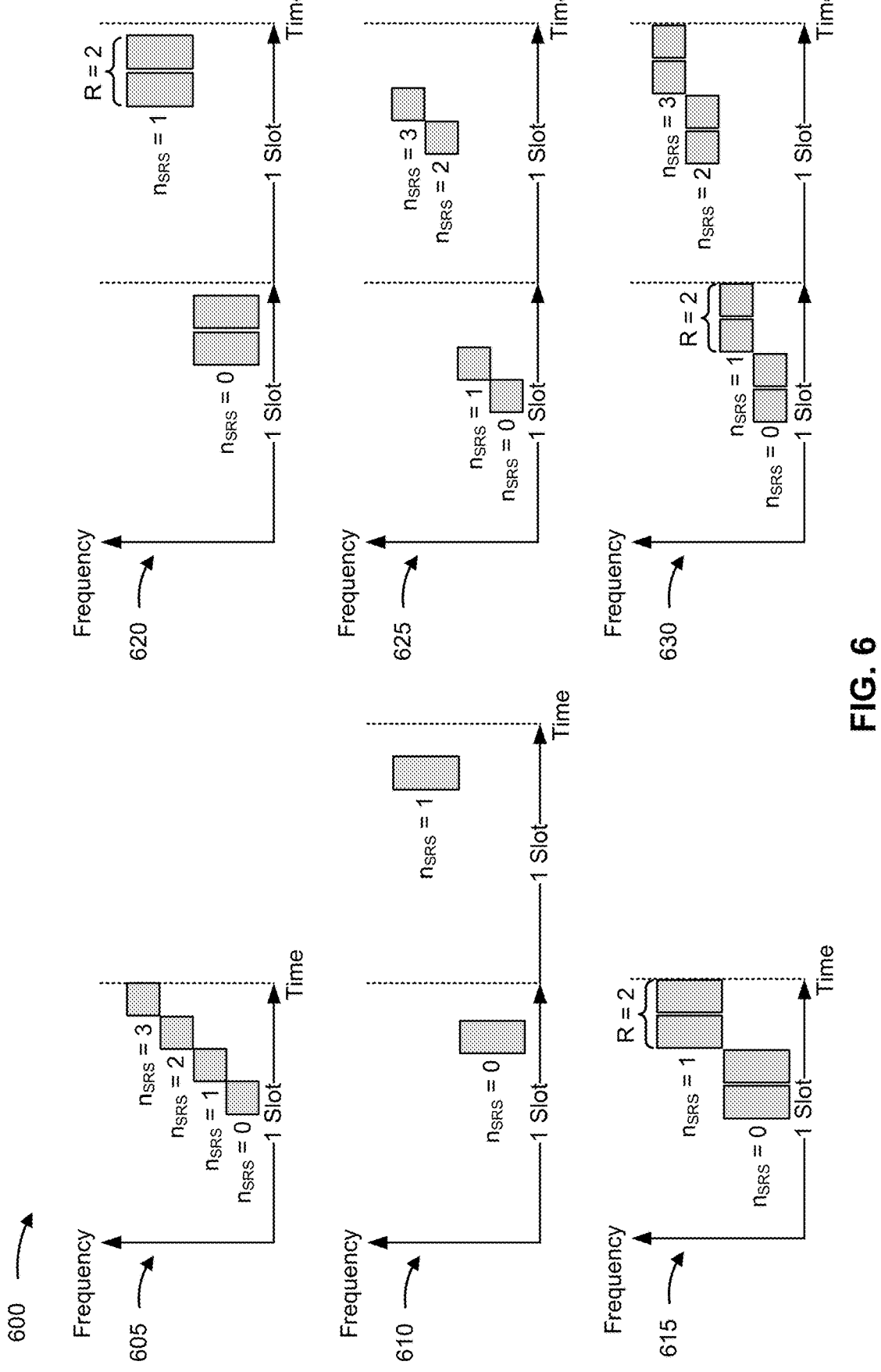
FIG. 6 is a diagram illustrating an example of SRS frequency hopping, in accordance with the present disclosure.

FIG. 6 is a diagram illustrating an example 600 of SRS frequency hopping, in accordance with the present disclosure. SRS frequency hopping may be performed according to several different schemes. For example, the SRS frequency hopping may be performed using a scheme 605 with intra-slot frequency hopping with no SRS repetition, a scheme 610 with inter-slot frequency hopping with no SRS repetition, a scheme 615 with intra-slot frequency hopping with SRS repetition, a scheme 620 with inter-slot frequency hopping with SRS repetition, a scheme 625 with inter-slot frequency hopping and intra-slot frequency hopping with no SRS repetition, or a scheme 630 with inter-slot frequency hopping and intra-slot frequency hopping with SRS repetition.

A UE may be configured with an SRS resource that has frequency hopping enabled by a frequency hopping parameter ($b_{hop} \in \{0,1,2,3\}$). For example, if a value of the frequency hopping parameter is less than an SRS bandwidth parameter ($B_{SRS}$) configured for the UE, then frequency hopping is enabled for the UE. A frequency hopping pattern for the frequency hopping may be determined according to a set of parameters. Some parameters may be signaled to the UE, and others may be determined by the UE (e.g., based at least in part on another parameter). The set of parameters may include, for example, a frequency domain shift position $n_{RRC}$ (which may be configured in a frequency domain position parameter for the SRS resource), a size of each subband to be hopped $m_{SRS,b}$, a number of subbands to be hopped $N_b$ for $b=B_{SRS}$ (which May be determined based at least in part on a row of a table, where the table is defined by a wireless communication specification or signaled to the UE), and an SRS counter $n_{SRS}$.

The frequency (or subband) hopping may be based at least in part on a parameter $n_b$, where:

$$n_b = \begin{cases} \lfloor 4n_{RRC}/m_{SRS,b} \rfloor \bmod N_b & b \le b_{hop} \\ (F_b(n_{SRS}) + \lfloor 4n_{RRC}/m_{SRS,b} \rfloor) \bmod N_b & \text{otherwise} \end{cases} \quad \text{Equation 1}$$

For example, $n_b$ may identify frequency position indices of frequency hopping occasions. $N_b$ may be a subband index, and may control the index of the subband hop of each SRS occasion. In some examples, $N_b$ may be given by a table, such as a table defined in a wireless communication standard or signaled to the UE. The frequency hopping pattern may be given by Equation 2:

$$F_b(n_{SRS}) = \qquad\qquad\qquad\qquad \text{Equation 2}$$

$$\begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\[4ex] \lfloor N_b/2 \rfloor \lfloor n_{SRS}/\prod_{b'=b_{hop}}^{b-1} N_{b'} \rfloor & \text{if } N_b \text{ odd} \end{cases}$$

where $N_{b_{hop}} = 1$ regardless of the value of Np. The quantity $n_{SRS}$ may count the quantity of SRS transmissions. For an aperiodic SRS resource, within a slot in which an $$N_{symb}^{SRS}$$

symbol resource is transmitted, $n_{SRS}$ may be given by Equation 3:

$$n_{SRS} = \lfloor l'/R \rfloor \qquad\qquad \text{Equation 3}$$

where R $$(R \le N_{symb}^{SRS})$$

is a repetition factor (e.g., a quantity of repetitions) configured in the SRS resource, and l' is the counter of the SRS symbol (e.g., the SRS symbol index). For a periodic or semi-persistent SRS resource, for slots that satisfy $$(N_{slot}^{frame,\mu} n_f + n_{s,f}^{\mu} - T_{offset}) \bmod T_{SRS} = 0, n_{SRS}$$

may be given by Equation 4:

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \qquad \text{Equation 4}$$

where $$N_{slot}^{frame,\mu} n_f$$

identifies a quantity of slots in a frame, $n_f$ identifies a frame index, $$n_{s,f}^{\mu}$$

identifies a subframe index, and $T_{SRS}$ and $T_{offset}$ identify a periodicity in slots and a slot offset, respectively.

Thus, stated one way, the frequency hopping pattern may be determined by $F_b(n_{SRS})$, which may be a function of $n_{SRS}$, and $n_{SRS}$ is a counter of SRS transmissions. Accordingly, as shown, each frequency hop of a frequency hopping pattern may be based at least in part on incrementing the $n_{SRS}$ counter. Furthermore, multiple OFDM symbols with SRS repetition (e.g., R>1) are counted as one SRS transmission by the $n_{SRS}$ counter.

For legacy codebook-based PUSCH communication (e.g., using an indicated uplink precoder), SRS ports may have to be sounded simultaneously in a single OFDM symbol. However, for eight SRS ports in codebook-based PUSCH communication, sounding the eight SRS ports in multiple OFDM symbols has been introduced. Accordingly, a UE may use higher power to sound each SRS port. For example, for sounding eight SRS ports in a single OFDM symbol, a transmit power may be divided among the eight SRS ports. However, for sounding eight SRS ports in eight OFDM symbols, four OFDM symbols, or two OFDM symbols, a transmit power is undivided, is divided among two SRS ports, or is divided among four SRS ports, respectively.

In some examples, SRS transmissions may use frequency hopping, as described herein. SRS frequency hopping may use subband SRSs to sweep a larger bandwidth in multiple OFDM symbols. In legacy schemes, a single OFDM symbol may include all SRS ports, and therefore all SRS ports frequency hop together. However, for SRS ports distributed to multiple OFDM symbols, a single symbol includes only a subset of the SRS ports. Accordingly, frequency hopping on a per-symbol basis will result in less than all of the antenna ports being sounded in each frequency hop. As a result, the SRS transmissions of the UE may be less robust, thereby impacting uplink channel estimation used for scheduling, link adaptation, precoder selection, or beam management, among other examples, that use measurement of the SRS transmissions.

Some techniques and apparatuses described herein enable frequency hopping for SRS transmissions on antenna ports having a distributed mapping to multiple OFDM symbols of an SRS resource. In some aspects, a UE may transmit SRSs on the multiple antenna ports in multiple OFDM symbols of the SRS resource (e.g., according to the distributed mapping) in a single frequency hop (e.g., a subband) of a frequency hopping pattern. This may be achieved by treating the multiple OFDM symbols as a single OFDM symbol (e.g., a single unit) in connection with counting SRS transmissions ($n_{SRS}$). Moreover, for SRS repetition in the SRS resource, a UE may transmit SRSs on the multiple antenna ports in first multiple OFDM symbols of the SRS resource (e.g., according to the distributed mapping), and one or more repetitions of the SRSs on the multiple antenna ports in second multiple OFDM symbols of the SRS resource (e.g., according to the distributed mapping), in a single frequency hop (e.g., a subband) of a frequency hopping pattern. This may be achieved by treating the first multiple OFDM symbols and the second multiple OFDM symbols as a single OFDM symbol (e.g., a single unit) in connection with counting SRS transmissions ($n_{SRS}$).

In this way, SRS transmissions on all of the multiple antenna ports may be performed in each frequency hop. Accordingly, the SRS transmissions are diverse in a time domain and a frequency domain, thereby improving uplink channel estimation used for scheduling, link adaptation, precoder selection, or beam management, among other examples, that use measurement of the SRS transmissions.

As indicated above, FIG. 6 is provided as an example. Other examples may differ from what is described with respect to FIG. 6.

Figure 7:
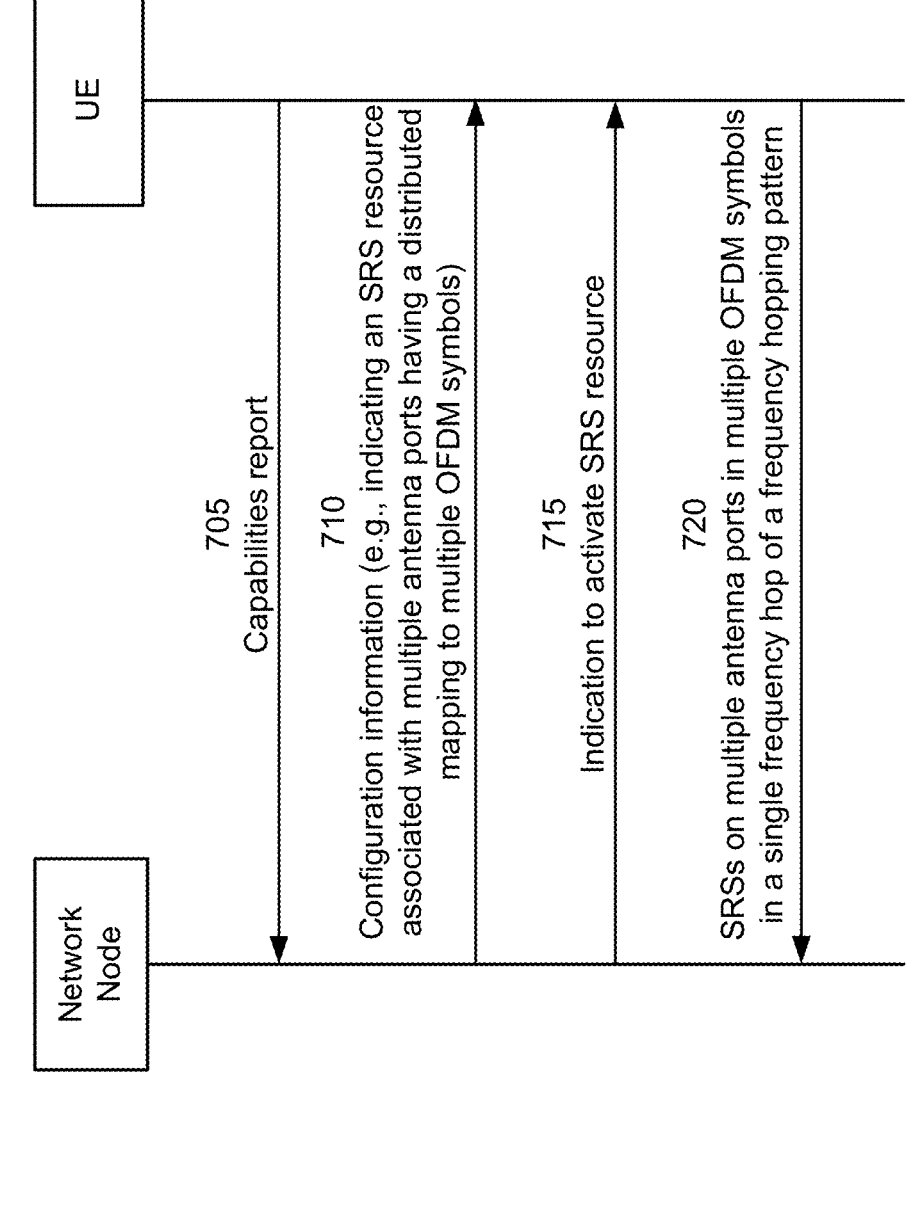
FIG. 7 is a diagram of an example associated with SRS frequency hopping for distributed antenna port mapping, in accordance with the present disclosure.

FIG. 7 is a diagram of an example 700 associated with SRS frequency hopping for distributed antenna port mapping, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown by reference number 705, the UE may transmit, and the network node may receive, a capabilities report (e.g., UE capability information). In some aspects, the capabilities report may indicate UE support for distributed SRS port mapping.

As shown by reference number 710, the network node may transmit, and the UE may receive, configuration information. In some aspects, the UE may receive the configuration information via one or more of RRC signaling, one or more MAC-CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate an SRS resource set for the UE. The SRS resource set may include a plurality of SRS resources. For each SRS resource, the configuration information may identify a quantity of antenna ports included in the SRS resource, a time domain resource for the SRS resource, a quantity of OFDM symbols, such as two, four, or eight OFDM symbols, over which distributed SRS port mapping is used, a repetition factor for SRS transmissions, a frequency domain resource for the SRS resource, a frequency hopping indication (e.g., used to identify a frequency hopping pattern), and a resource type of the SRS resource (e.g., aperiodic, semi-persistent, or periodic), among other examples. In some aspects, the SRS resource set may include an SRS resource associated with multiple antenna ports having a distributed mapping to multiple OFDM symbols of the SRS resource. According to the distributed mapping, a respective subset (e.g., less than all) of the multiple antenna ports are mapped to each of the multiple OFDM symbols. For example, the SRS resource may be associated with eight antenna ports, and the eight antenna ports may be distributed to two OFDM symbols (e.g., four antenna ports for each OFDM symbols), four OFDM symbols (e.g., two antenna ports for each OFDM symbol), or eight OFDM symbols (e.g., one antenna port for each OFDM symbol). Moreover, frequency hopping may be enabled for the SRS resource.

The UE may configure itself based at least in part on the configuration information. In some aspects, the UE may be configured to perform one or more operations described herein based at least in part on the configuration information. As shown by reference number 715, the UE may receive, and the network node may transmit, an indication to activate an SRS resource for SRS transmission. The indication may be via a MAC-CE or DCI.

As shown by reference number 720, the UE may transmit, and the network node may receive, in a single frequency hop of a frequency hopping pattern, a plurality of SRSs on the multiple antenna ports in the multiple OFDM symbols (according to the distribution of the antenna ports across the OFDM symbols) of the SRS resource. In some aspects, repetition may be configured for the SRS resource, in which case, the UE may transmit, and the network node may receive, in the single frequency hop, the SRSs and one or more repetitions of the SRSs in the SRS resource. For example, the UE may transmit, in the single frequency hop, the SRSs in first multiple OFDM symbols (according to the distribution of the antenna ports across the OFDM symbols) of the SRS resource and transmit a repetition of the SRSs in second multiple OFDM symbols (according to the distribution of the antenna ports across the OFDM symbols) of the SRS resource.

In other words, for SRS frequency hopping in connection with distributed antenna port mapping to multiple OFDM symbols (where L is the quantity of OFDM symbols, L>1), the L OFDM symbols may be treated as a single OFDM symbol (which can be referred to as a "super OFDM symbol"). Accordingly, SRS transmissions in L OFDM symbols may be in the same frequency hop. In this way, SRS frequency hopping in connection with distributed antenna port mapping to multiple OFDM symbols may be compatible with legacy frequency hopping mechanisms or equations. Furthermore, if a repetition factor (referred to as R) is configured for the SRS resource, repetition may be applied to R super OFDM symbols. In other words, the repetition factor for the SRS resource may be applicable to the multiple OFDM symbols as a single unit. For example, SRS transmissions in LxR OFDM symbols may be in the same frequency hop.

The frequency hopping pattern used for SRS transmissions may be an intra-slot frequency hopping pattern or an inter-slot frequency hopping pattern. As an example of intra-slot frequency hopping, the UE may transmit, and the network node may receive, in a first frequency hop, the SRSs on the multiple antenna ports in first multiple OFDM symbols of the SRS resource (repetitions of the SRSs may also be in the first frequency hop). Continuing with the example, the UE may transmit, and the network node may receive, in a second frequency hop, the SRSs on the multiple antenna ports in second multiple OFDM symbols of the SRS resource (repetitions of the SRSs may also be in the second frequency hop). In other words, each frequency hop relates to different time resources in the same occasion of the SRS resource. As an example of inter-slot frequency hopping, the UE may transmit, and the network node may receive, in a first frequency hop, the SRSs on the multiple antenna ports in first multiple OFDM symbols of a first occasion of the SRS resource (repetitions of the SRSs may also be in the first frequency hop). Continuing with the example, the UE may transmit, and the network node may receive, in a second frequency hop, the SRSs on the multiple antenna ports in second multiple OFDM symbols of a second occasion of the SRS resource (repetitions of the SRSs may also be in the second frequency hop). In other words, each frequency hop relates to the same time resources in different occasions of the SRS resource.

The frequency hopping pattern may be a function of a count of a quantity of SRS transmissions. For example, the UE and the network node may count the quantity of SRS transmissions and determine the frequency hopping pattern as a function of the count of the quantity of SRS transmissions (e.g., in accordance with Equation 2). Furthermore, the count of the quantity of SRS transmissions may be in accordance with the multiple OFDM symbols, over which the multiple antenna ports are distributed, being counted as a single OFDM symbol (e.g., the multiple OFDM symbols are assumed to be, or otherwise treated as, a single OFDM symbol for determining the count of the quantity of SRS transmissions). For example, the SRSs in the multiple OFDM symbols may correspond to (e.g., may be counted as) a single SRS transmission. In addition, if repetition is configured for the SRS resource, then the SRSs and one or more repetitions of the SRSs in the SRS resource may correspond to (e.g., may be counted as) a single SRS transmission. In this way, the count of the quantity of SRS transmissions may be per (e.g., scaled by) a quantity L of the multiple OFDM symbols over which the multiple antenna ports are distributed.

In some aspects, the count of the quantity of SRS transmissions for distributed SRS port mapping may be defined according to Equations 5 or 6 below. For the case of an SRS resource configured as an aperiodic resource type (e.g., by the higher-layer parameter resourceType), the count of the quantity of SRS transmissions ($n_{SRS}$) may be according to Equation 5:

$$n_{SRS} = \lfloor l''/R \rfloor \qquad \text{Equation 5}$$

where $l'' = \lfloor l'/L \rfloor$.

For the case of an SRS resource configured as a periodic resource type or a semi-persistent resource type (e.g., by the higher-layer parameter resourceType), the count of the quantity of SRS transmissions ($n_{SRS}$) may be according to Equation 6:

$$n_{SRS} = \left( \frac{N_{slot}^{frame,\mu} n_f^{\mu} + n_{s,f}^{\mu} - T_{offset}}{T_{SRS}} \right) \left( \frac{N_{symb}^{SRS}}{LR} \right) + \left\lfloor \frac{l''}{R} \right\rfloor \qquad \text{Equation 6}$$

where $l'' = \lfloor l'/L \rfloor$. Thus, $l''$ redefines $l'$, described above in connection with Equations 3 and 4, as a counter per L OFDM symbols.

In some aspects, the count of the quantity of SRS transmissions for distributed SRS port mapping may be defined according to Equation 7 or Equation 8 below. For the case of an SRS resource configured as an aperiodic resource type (e.g., by the higher-layer parameter resourceType), the count of the quantity of SRS transmissions ($n_{SRS}$) may be according to Equation 7:

$$n_{SRS} = \lfloor l'/LR \rfloor \qquad \text{Equation 7}$$

For the case of an SRS resource configured as a periodic resource type or a semi-persistent resource type (e.g., by the higher-layer parameter resourceType), the count of the quantity of SRS transmissions ($n_{SRS}$) may be according to Equation 8:

$$n_{SRS} = \left( \frac{N_{slot}^{frame,\mu} n_f^{\mu} + n_{s,f}^{\mu} - T_{offset}}{T_{SRS}} \right) \left( \frac{N_{symb}^{SRS}}{LR} \right) + \left\lfloor \frac{l'}{LR} \right\rfloor \qquad \text{Equation 8}$$

Thus, Equations 3 and 4, described above, may be modified to count per L OFDM symbols.

Accordingly, the UE may use frequency hopping for SRS transmissions on SRS ports having a distributed mapping to multiple OFDM symbols of an SRS resource. In this way, the SRS transmissions have time domain and frequency domain diversity, thereby improving uplink channel estimation used for scheduling, link adaptation, precoder selection, or beam management, among other examples, that use measurement of the SRS transmissions.

As indicated above, FIG. 7 is provided as an example. Other examples may differ from what is described with respect to FIG. 7.

Figure 8:
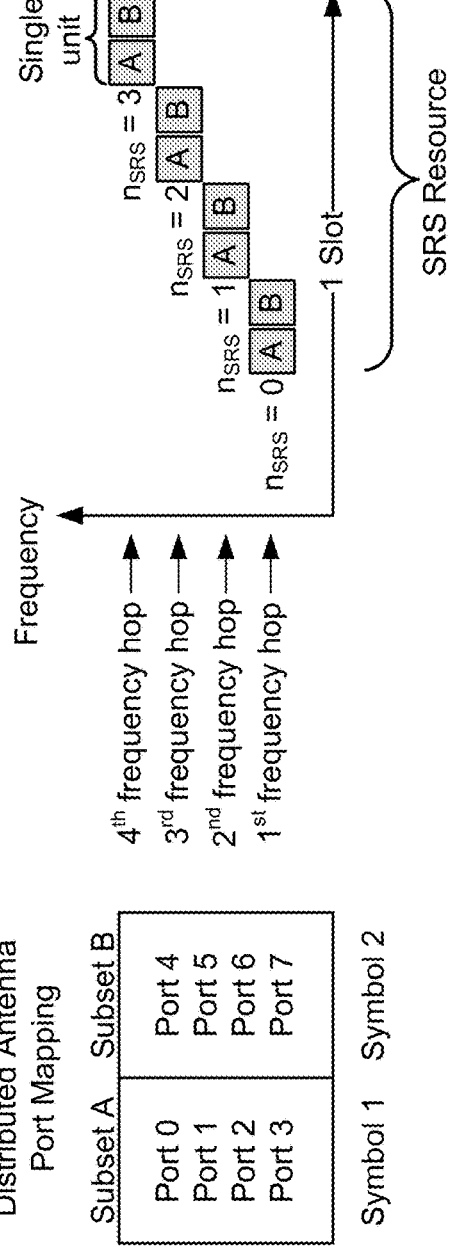
FIG. 8 is a diagram illustrating an example associated with SRS frequency hopping for distributed antenna port mapping, in accordance with the present disclosure.

FIG. 8 is a diagram illustrating an example 800 associated with SRS frequency hopping for distributed antenna port mapping, in accordance with the present disclosure. In particular, example 800 relates to intra-slot SRS frequency hopping with no SRS repetition. Moreover, in example 800, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 800.

As shown, a first frequency hop of a frequency hopping pattern may include SRSs communicated on the multiple antenna ports distributed to first multiple OFDM symbols in the SRS resource. By treating the first multiple OFDM symbols as a single OFDM symbol (e.g., a single unit), these SRSs may be counted (by $n_{SRS}$) as a first SRS transmission in connection with determining the frequency hopping pattern (using Equation 2). Furthermore, a second frequency hop of the frequency hopping pattern may include SRSs communicated on the multiple antenna ports distributed to second multiple OFDM symbols in the SRS resource. By treating the second multiple OFDM symbols as a single OFDM symbol (e.g., a single unit), these SRSs may be counted (by $n_{SRS}$) as a second SRS transmission in connection with determining the frequency hopping pattern, and so forth.

As indicated above, FIG. 8 is provided as an example. Other examples may differ from what is described with respect to FIG. 8.

Figure 9:
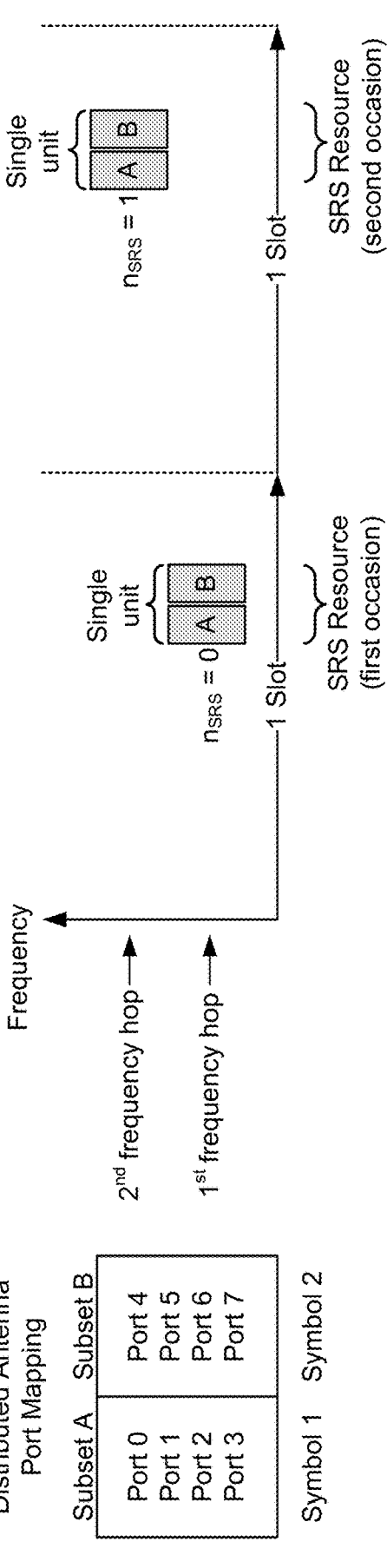
FIG. 9 is a diagram illustrating an example associated with SRS frequency hopping for distributed antenna port mapping, in accordance with the present disclosure.

FIG. 9 is a diagram illustrating an example 900 associated with SRS frequency hopping for distributed antenna port mapping, in accordance with the present disclosure. In particular, example 900 relates to inter-slot SRS frequency hopping with no SRS repetition. Moreover, in example 900, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 900.

As shown, a first frequency hop of a frequency hopping pattern may include SRSs communicated on the multiple antenna ports distributed to multiple OFDM symbols of a first occasion of the SRS resource. By treating the multiple OFDM symbols of the first occasion of the SRS resource as a single OFDM symbol (e.g., a single unit), these SRSs may be counted (by $n_{SRS}$) as a first SRS transmission in connection with determining the frequency hopping pattern (using Equation 2). Furthermore, a second frequency hop of the frequency hopping pattern may include SRSs communicated on the multiple antenna ports distributed to multiple OFDM symbols of a second occasion of the SRS resource. By treating the multiple OFDM symbols of the second occasion of the SRS resource as a single OFDM symbol (e.g., a single unit), these SRSs may be counted (by $n_{SRS}$) as a second SRS transmission in connection with determining the frequency hopping pattern, and so forth.

As indicated above, FIG. 9 is provided as an example. Other examples may differ from what is described with respect to FIG. 9.

Figure 10:
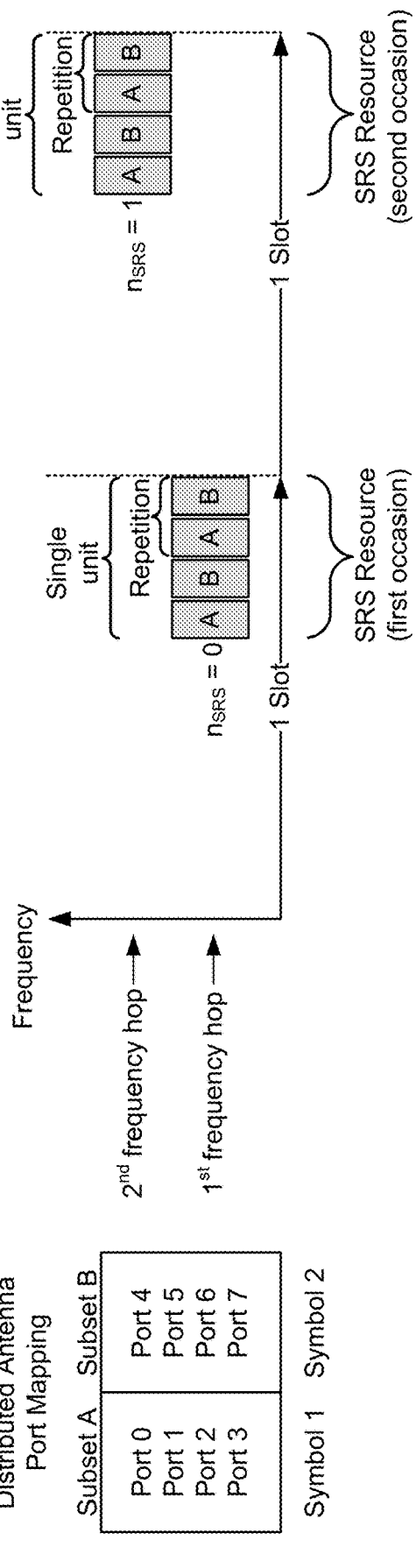
FIG. 10 is a diagram illustrating an example associated with SRS frequency hopping for distributed antenna port mapping, in accordance with the present disclosure.

FIG. 10 is a diagram illustrating an example 1000 associated with SRS frequency hopping for distributed antenna port mapping, in accordance with the present disclosure. In particular, example 1000 relates to inter-slot SRS frequency hopping with SRS repetition. Moreover, in example 1000, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 1000.

As shown, a first frequency hop of a frequency hopping pattern may include SRSs communicated on the multiple antenna ports distributed to first multiple OFDM symbols of a first occasion of the SRS resource. In addition, the first frequency hop may include a repetition of the SRSs communicated on the multiple antenna ports distributed to second multiple OFDM symbols of the first occasion of the SRS resource. By treating the first multiple OFDM symbols and the second multiple OFDM symbols of the first occasion of the SRS resource as a single OFDM symbol (e.g., a single unit), these SRSs and repetition of the SRSs may be counted (by $n_{SRS}$) as a first SRS transmission in connection with determining the frequency hopping pattern (using Equation 2). Furthermore, a second frequency hop of the frequency hopping pattern may include SRSs communicated on the multiple antenna ports distributed to first multiple OFDM symbols of a second occasion of the SRS resource. In addition, the second frequency hop may include a repetition of the SRSs communicated on the multiple antenna ports distributed to second multiple OFDM symbols of the second occasion of the SRS resource. By treating the first multiple OFDM symbols and the second multiple OFDM symbols of the second occasion of the SRS resource as a single OFDM symbol (e.g., a single unit), these SRSs and repetition of the SRSs may be counted (by $n_{SRS}$) as a second SRS transmission in connection with determining the frequency hopping pattern (using Equation 2), and so forth.

As indicated above, FIG. 1000 is provided as an example. Other examples may differ from what is described with respect to FIG. 1000.

Figure 11:
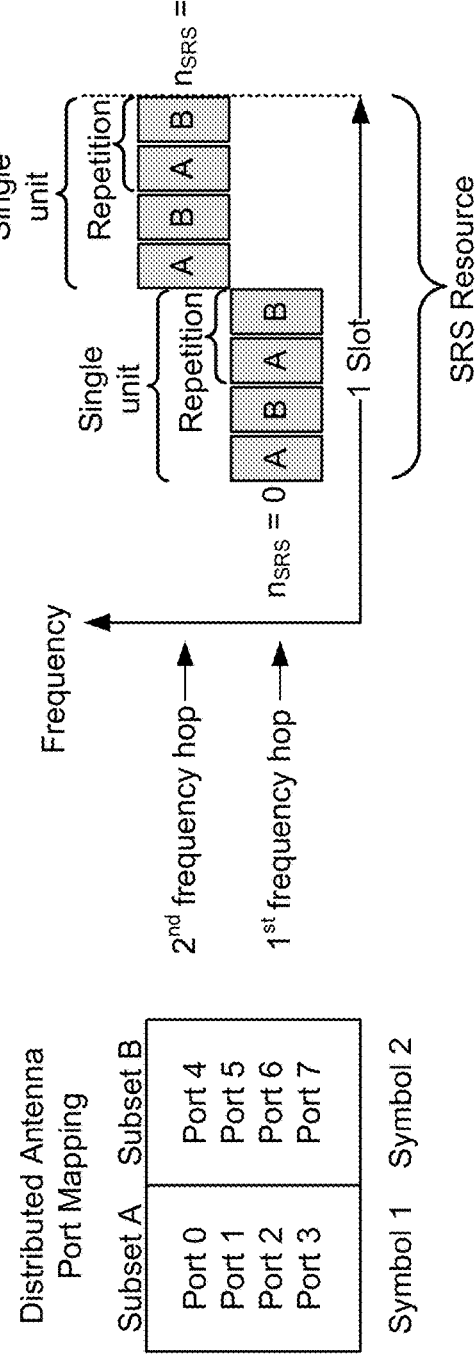
FIG. 11 is a diagram illustrating an example associated with SRS frequency hopping for distributed antenna port mapping, in accordance with the present disclosure.

FIG. 11 is a diagram illustrating an example 1100 associated with SRS frequency hopping for distributed antenna port mapping, in accordance with the present disclosure. In particular, example 1100 relates to intra-slot SRS frequency hopping with SRS repetition. Moreover, in example 1100, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 1100.

As shown, a first frequency hop of a frequency hopping pattern may include SRSs communicated on the multiple antenna ports distributed to first OFDM symbols intervals of the SRS resource. In addition, the first frequency hop may include a repetition of the SRSs communicated on the multiple antenna ports distributed to second multiple OFDM symbols of the SRS resource. By treating the first multiple OFDM symbols and the second multiple OFDM symbols as a single OFDM symbol (e.g., a single unit), these SRSs and repetition of the SRSs may be counted (by $n_{SRS}$) as a first SRS transmission in connection with determining the frequency hopping pattern (using Equation 2). Furthermore, a second frequency hop of the frequency hopping pattern may include SRSs communicated on the multiple antenna ports distributed to third multiple OFDM symbols of the SRS resource. In addition, the second frequency hop may include a repetition of the SRSs communicated on the multiple antenna ports distributed to fourth multiple OFDM symbols of the SRS resource. By treating the third multiple OFDM symbols and the fourth multiple OFDM symbols of the SRS resource as a single OFDM symbol (e.g., a single unit), these SRSs and repetition of the SRSs may be counted (by $n_{SRS}$) as a second SRS transmission in connection with determining the frequency hopping pattern (using Equation 2), and so forth.

As indicated above, FIG. 1100 is provided as an example. Other examples may differ from what is described with respect to FIG. 1100.

Figure 12:
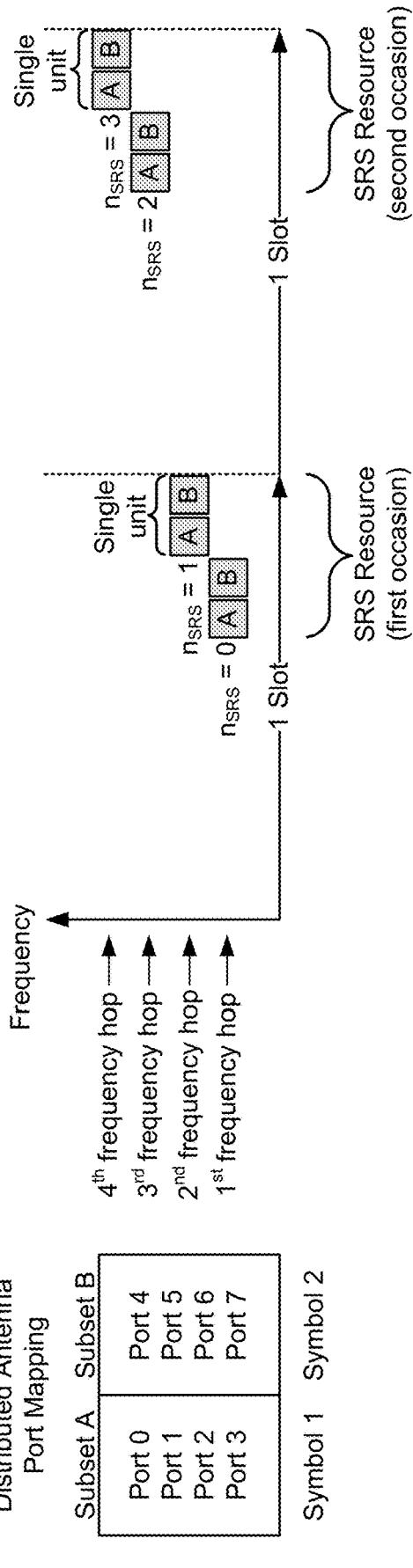
FIG. 12 is a diagram illustrating an example associated with SRS frequency hopping for distributed antenna port mapping, in accordance with the present disclosure.

FIG. 12 is a diagram illustrating an example 1200 associated with SRS frequency hopping for distributed antenna port mapping, in accordance with the present disclosure. In particular, example 1200 relates to inter-slot SRS frequency hopping and intra-slot SRS frequency hopping with no SRS repetition. Moreover, in example 1200, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 1200.

As shown, a first frequency hop of a frequency hopping pattern may include SRSs communicated on the multiple antenna ports distributed to first multiple OFDM symbols in a first occasion of the SRS resource. By treating the first multiple OFDM symbols of the first occasion of the SRS resource as a single OFDM symbol (e.g., a single unit), these SRSs may be counted (by $n_{SRS}$) as a first SRS transmission in connection with determining the frequency hopping pattern (using Equation 2). In addition, a second frequency hop of the frequency hopping pattern may include SRSs communicated on the multiple antenna ports distributed to second multiple OFDM symbols in the first occasion of the SRS resource. By treating the second multiple OFDM symbols of the first occasion of the SRS resource as a single OFDM symbol (e.g., a single unit), these SRSs may be counted (by $n_{SRS}$) as a second SRS transmission in connection with determining the frequency hopping pattern (using Equation 2).

Furthermore, a third frequency hop of the frequency hopping pattern may include SRSs communicated on the multiple antenna ports distributed to first multiple OFDM symbols in a second occasion of the SRS resource. By treating the first multiple OFDM symbols of the second occasion of the SRS resource as a single OFDM symbol (e.g., a single unit), these SRSs may be counted (by $n_{SRS}$) as a third SRS transmission in connection with determining the frequency hopping pattern (using Equation 2). In addition, a fourth frequency hop of the frequency hopping pattern may include SRSs communicated on the multiple antenna ports distributed to second multiple OFDM symbols in the second occasion of the SRS resource. By treating the second multiple OFDM symbols of the second occasion of the SRS resource as a single OFDM symbol (e.g., a single unit), these SRSs may be counted (by $n_{SRS}$) as a fourth SRS transmission in connection with determining the frequency hopping pattern (using Equation 2), and so forth.

As indicated above, FIG. 1200 is provided as an example. Other examples may differ from what is described with respect to FIG. 1200.

Figure 13:
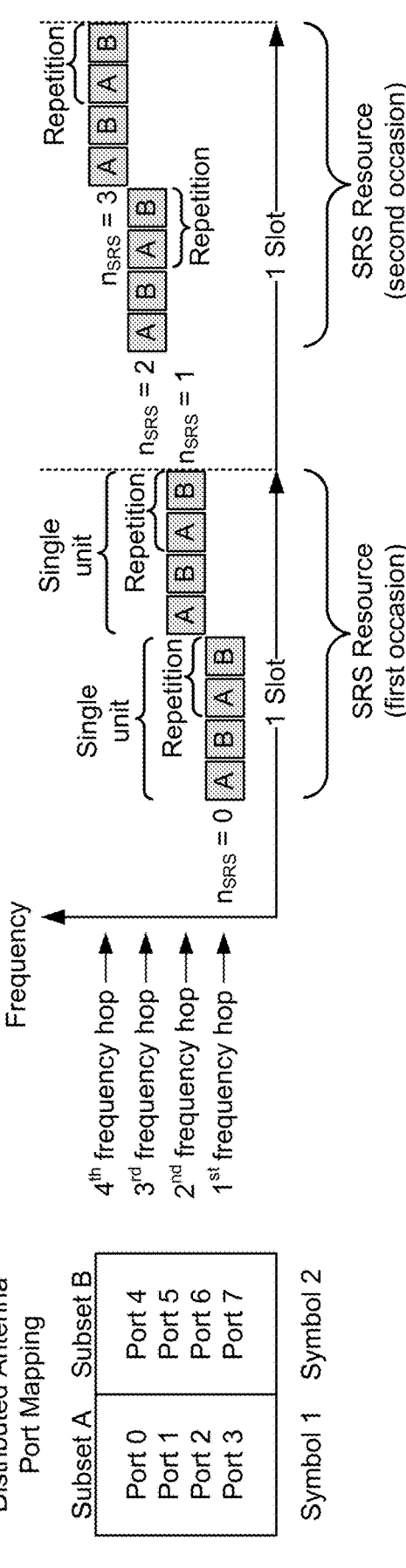
FIG. 13 is a diagram illustrating an example associated with SRS frequency hopping for distributed antenna port mapping, in accordance with the present disclosure.

FIG. 13 is a diagram illustrating an example 1300 associated with SRS frequency hopping for distributed antenna port mapping, in accordance with the present disclosure. In particular, example 1300 relates to inter-slot SRS frequency hopping and intra-slot SRS frequency hopping with SRS repetition. Moreover, in example 1300, multiple antenna ports, shown as eight antenna ports, associated with an SRS resource may have a distributed mapping to multiple OFDM symbols, shown as two OFDM symbols, of the SRS resource. Antenna ports mapped to a first of the OFDM symbols, shown as antenna ports 0, 1, 2, and 3, may be referred to as subset A, and antenna ports mapped to a second of the OFDM symbols, shown as antenna ports 4, 5, 6, and 7, may be referred to as subset B. In some aspects, the UE and the network node, described in connection with FIG. 7, may transmit and receive, respectively, the SRSs of example 1300.

As shown, a first frequency hop of a frequency hopping pattern may include SRSs communicated on the multiple antenna ports distributed to first multiple OFDM symbols in a first occasion of the SRS resource. In addition, the first frequency hop may include a repetition of the SRSs communicated on the multiple antenna ports distributed to second multiple OFDM symbols of the first occasion of the SRS resource. By treating the first multiple OFDM symbols and the second multiple OFDM symbols of the first occasion of the SRS resource as a single OFDM symbol (e.g., a single unit), these SRSs and repetition of the SRSs may be counted (by $n_{SRS}$) as a first SRS transmission in connection with determining the frequency hopping pattern (using Equation 2).

Moreover, a second frequency hop of the frequency hopping pattern may include SRSs communicated on the multiple antenna ports distributed to third multiple OFDM symbols in the first occasion of the SRS resource. In addition, the second frequency hop may include a repetition of the SRSs communicated on the multiple antenna ports distributed to fourth multiple OFDM symbols of the first occasion of the SRS resource. By treating the third multiple OFDM symbols and the fourth multiple OFDM symbols of the first occasion of the SRS resource as a single OFDM symbol (e.g., a single unit), these SRSs and repetition of the SRSs may be counted (by $n_{SRS}$) as a second SRS transmission in connection with determining the frequency hopping pattern (using Equation 2).

Furthermore, a third frequency hop of the frequency hopping pattern may include SRSs communicated on the multiple antenna ports distributed to first multiple OFDM symbols in a second occasion of the SRS resource. In addition, the third frequency hop may include a repetition of the SRSs communicated on the multiple antenna ports distributed to second multiple OFDM symbols of the second occasion of the SRS resource. By treating the first multiple OFDM symbols and the second multiple OFDM symbols of the second occasion of the SRS resource as a single OFDM symbol (e.g., a single unit), these SRSs and repetition of the SRSs may be counted (by $N_{SRS}$) as a third SRS transmission in connection with determining the frequency hopping pattern (using Equation 2).

Moreover, a fourth frequency hop of the frequency hopping pattern may include SRSs communicated on the multiple antenna ports distributed to third multiple OFDM symbols in the second occasion of the SRS resource. In addition, the fourth frequency hop may include a repetition of the SRSs communicated on the multiple antenna ports distributed to fourth multiple OFDM symbols of second occasion of the SRS resource. By treating the third multiple OFDM symbols and the fourth multiple OFDM symbols of the second occasion of the SRS resource as a single OFDM symbol (e.g., a single unit), these SRSs and repetition of the SRSs may be counted (by $n_{SRS}$) as a fourth SRS transmission in connection with determining the frequency hopping pattern (using Equation 2), and so forth.

As indicated above, FIG. 1300 is provided as an example. Other examples may differ from what is described with respect to FIG. 1300.

FIG. 14 is a diagram illustrating an example process 1400 performed, for example, by a UE, in accordance with the present disclosure. Example process 1400 is an example where the UE (e.g., UE 120) performs operations associated with SRS frequency hopping for distributed antenna port mapping.

As shown in FIG. 14, in some aspects, process 1400 may include receiving configuration information indicating an SRS resource set that includes an SRS resource, the SRS resource associated with multiple antenna ports and the multiple antenna ports having a distributed mapping to multiple OFDM symbols of the SRS resource (block 1410). For example, the UE (e.g., using reception component 1602 and/or communication manager 1606, depicted in FIG. 16) may receive configuration information indicating an SRS resource set that includes an SRS resource, the SRS resource associated with multiple antenna ports and the multiple antenna ports having a distributed mapping to multiple OFDM symbols of the SRS resource, as described above.

As further shown in FIG. 14, in some aspects, process 1400 may include transmitting a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols (block 1420). For example, the UE (e.g., using transmission component 1604 and/or communication manager 1606, depicted in FIG. 16) may transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols, as described above.

Process 1400 may include additional aspects, such as any single aspect or any combination of aspects described below and/or in connection with one or more other processes described elsewhere herein.

In a first aspect, the count of the quantity of SRS transmissions is based at least in part on the multiple OFDM symbols being counted as a single OFDM symbol.

In a second aspect, alone or in combination with the first aspect, the plurality of SRSs in the multiple OFDM symbols are counted as a single SRS transmission.

In a third aspect, alone or in combination with one or more of the first and second aspects, a repetition factor for the SRS resource is applicable to the multiple OFDM symbols as a single unit.

In a fourth aspect, alone or in combination with one or more of the first through third aspects, transmitting the plurality of SRSs includes transmitting, in a single frequency hop of the frequency hopping pattern, the plurality of SRSs and one or more repetitions of the plurality of SRSs in the SRS resource.

In a fifth aspect, alone or in combination with one or more of the first through fourth aspects, the plurality of SRSs and the one or more repetitions of the plurality of SRSs are counted as a single SRS transmission.

In a sixth aspect, alone or in combination with one or more of the first through fifth aspects, the count of the quantity of SRS transmissions is scaled by a quantity of the multiple OFDM symbols.

In a seventh aspect, alone or in combination with one or more of the first through sixth aspects, transmitting the plurality of SRSs includes transmitting, in a first frequency hop of the frequency hopping pattern, the plurality of SRSs on the multiple antenna ports in first multiple OFDM symbols of the SRS resource, and process 1400 may include transmitting, in a second frequency hop of the frequency hopping pattern, additional SRSs on the multiple antenna ports in second OFDM symbols of the SRS resource.

In an eighth aspect, alone or in combination with one or more of the first through seventh aspects, transmitting the plurality of SRSs includes transmitting, in a first frequency hop of the frequency hopping pattern, the plurality of SRSs on the multiple antenna ports in first multiple OFDM symbols of a first occasion of the SRS resource, and process 1400 may further include transmitting, in a second frequency hop of the frequency hopping pattern, the plurality of SRSs on the multiple antenna ports in second multiple OFDM symbols of a second occasion of the SRS resource.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a network node, in accordance with the present disclosure. Example process 1500 is an example where the network node (e.g., network node 110) performs operations associated with SRS frequency hopping for distributed antenna port mapping.

As shown in FIG. 15, in some aspects, process 1500 may include transmitting configuration information indicating an SRS resource set that includes an SRS resource, the SRS resource associated with multiple antenna ports and the multiple antenna ports having a distributed mapping to multiple OFDM symbols of the SRS resource (block 1510).

Figure 17:
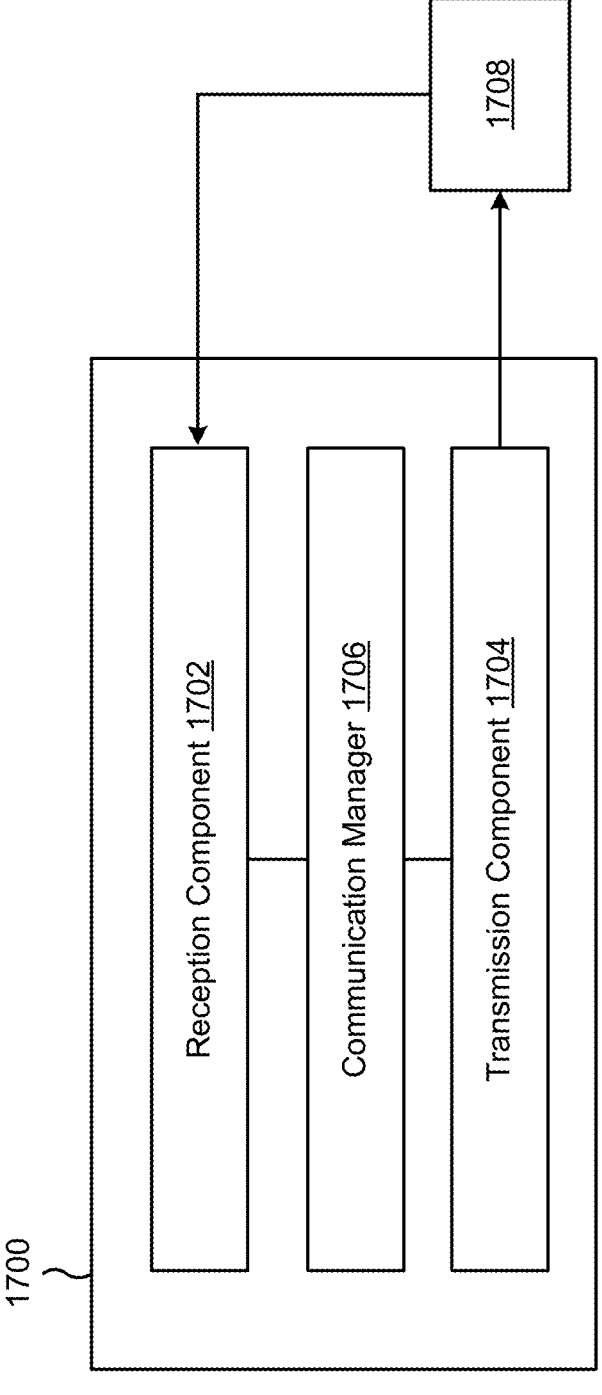
FIG. 17 is a diagram of an example apparatus for wireless communication, in accordance with the present disclosure.

For example, the network node (e.g., using transmission component 1704 and/or communication manager 1706, depicted in FIG. 17) may transmit configuration information indicating an SRS resource set that includes an SRS resource, the SRS resource associated with multiple antenna ports and the multiple antenna ports having a distributed mapping to multiple OFDM symbols of the SRS resource, as described above.

As further shown in FIG. 15, in some aspects, process 1500 may include receiving a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols (block 1520). For example, the network node (e.g., using reception component 1702 and/or communication manager 1706, depicted in FIG. 17) may receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols, as described above.

Process 1500 may include additional aspects, such as any single aspect or any combination of aspects described below and/or in connection with one or more other processes described elsewhere herein.

In a first aspect, the count of the quantity of SRS transmissions is based at least in part on the multiple OFDM symbols being counted as a single OFDM symbol.

In a second aspect, alone or in combination with the first aspect, the plurality of SRSs in the multiple OFDM symbols are counted as a single SRS transmission.

In a third aspect, alone or in combination with one or more of the first and second aspects, a repetition factor for the SRS resource is applicable to the multiple OFDM symbols as a single unit.

In a fourth aspect, alone or in combination with one or more of the first through third aspects, receiving the plurality of SRSs includes receiving, in a single frequency hop of the frequency hopping pattern, the plurality of SRSs and one or more repetitions of the plurality of SRSs in the SRS resource.

In a fifth aspect, alone or in combination with one or more of the first through fourth aspects, the plurality of SRSs and the one or more repetitions of the plurality of SRSs are counted as a single SRS transmission.

In a sixth aspect, alone or in combination with one or more of the first through fifth aspects, the count of the quantity of SRS transmissions is scaled by a quantity of the multiple OFDM symbols.

In a seventh aspect, alone or in combination with one or more of the first through sixth aspects, receiving the plurality of SRSs includes receiving, in a first frequency hop of the frequency hopping pattern, the plurality of SRSs on the multiple antenna ports in first multiple OFDM symbols of the SRS resource, and process 1500 may include receiving, in a second frequency hop of the frequency hopping pattern, the plurality of SRSs on the multiple antenna ports in second multiple OFDM symbols of the SRS resource.

In an eighth aspect, alone or in combination with one or more of the first through seventh aspects, receiving the plurality of SRSs includes receiving, in a first frequency hop of the frequency hopping pattern, the plurality of SRSs on the multiple antenna ports in first multiple OFDM symbols of a first occasion of the SRS resource, and process 1500 may include receiving, in a second frequency hop of the frequency hopping pattern, the plurality of SRSs on the multiple antenna ports in second multiple OFDM symbols of a second occasion of the SRS resource.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
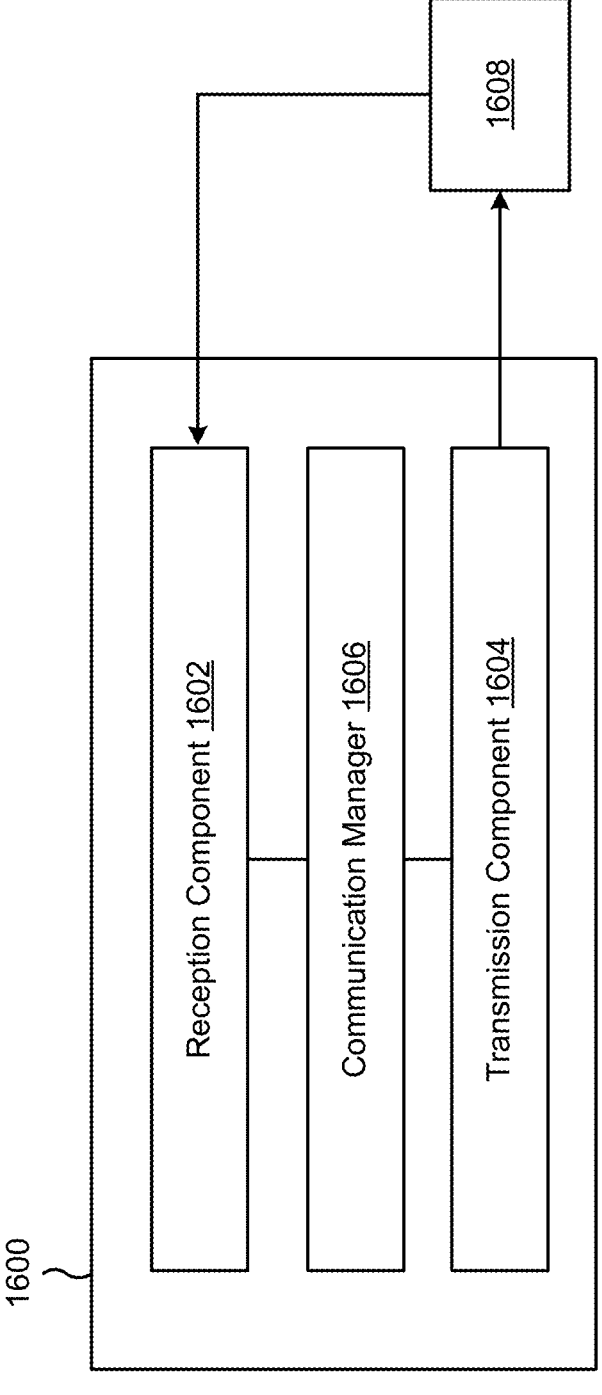
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a UE, or a UE may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 140 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 7-13. Additionally, or alternatively, the apparatus 1600 may be configured to perform one or more processes described herein, such as process 1400 of FIG. 14, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

The reception component 1602 may receive configuration information indicating an SRS resource set that includes an SRS resource, the SRS resource associated with multiple antenna ports and the multiple antenna ports having a distributed mapping to multiple OFDM symbols of the SRS resource. The transmission component 1604 may transmit a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

FIG. 17 is a diagram of an example apparatus 1700 for wireless communication, in accordance with the present disclosure. The apparatus 1700 may be a network node, or a network node may include the apparatus 1700. In some aspects, the apparatus 1700 includes a reception component 1702, a transmission component 1704, and/or a communication manager 1706, which may be in communication with one another (for example, via one or more buses and/or one or more other components). In some aspects, the communication manager 1706 is the communication manager 150 described in connection with FIG. 1. As shown, the apparatus 1700 may communicate with another apparatus 1708, such as a UE or a network node (such as a CU, a DU, an RU, or a base station), using the reception component 1702 and the transmission component 1704.

In some aspects, the apparatus 1700 may be configured to perform one or more operations described herein in connection with FIGS. 7-13. Additionally, or alternatively, the apparatus 1700 may be configured to perform one or more processes described herein, such as process 1500 of FIG. 15, or a combination thereof. In some aspects, the apparatus 1700 and/or one or more components shown in FIG. 17 may include one or more components of the network node described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1708. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the network node described in connection with FIG. 2. In some aspects, the reception component 1702 and/or the transmission component 1704 may include or may be included in a network interface. The network interface may be configured to obtain and/or output signals for the apparatus 1700 via one or more communications links, such as a backhaul link, a midhaul link, and/or a fronthaul link.

The transmission component 1704 may transmit communications, such as reference signals, control information, data communications, or a combination thereof, to the apparatus 1708. In some aspects, one or more other components of the apparatus 1700 may generate communications and may provide the generated communications to the transmission component 1704 for transmission to the apparatus 1708. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1704 may include one or more antennas, a modem, a modulator, a transmit MIMO processor, a transmit processor, a controller/processor, a memory, or a combination thereof, of the network node described in connection with FIG. 2. In some aspects, the transmission component 1704 may be co-located with the reception component 1702 in a transceiver.

The communication manager 1706 may support operations of the reception component 1702 and/or the transmission component 1704. For example, the communication manager 1706 may receive information associated with configuring reception of communications by the reception component 1702 and/or transmission of communications by the transmission component 1704. Additionally, or alternatively, the communication manager 1706 may generate and/or provide control information to the reception component 1702 and/or the transmission component 1704 to control reception and/or transmission of communications.

The transmission component 1704 may transmit configuration information indicating an SRS resource set that includes an SRS resource, the SRS resource associated with multiple antenna ports and the multiple antenna ports having a distributed mapping to multiple OFDM symbols of the SRS resource. The reception component 1702 may receive a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and transmitting, in a single frequency hop of a frequency hopping pattern, a plurality of SRSs on the multiple antenna ports in the multiple OFDM symbols of the SRS resource.

Aspect 2: The method of Aspect 1, wherein the frequency hopping pattern is a function of a count of a quantity of SRS transmissions, and the count of the quantity of SRS transmissions is based at least in part on the multiple OFDM symbols being counted as a single OFDM symbol.

Aspect 3: The method of any of Aspects 1-2, wherein the frequency hopping pattern is a function of a count of a quantity of SRS transmissions, and the plurality of SRSs in the multiple OFDM symbols are counted as a single SRS transmission.

Aspect 4: The method of any of Aspects 1-3, wherein a repetition factor for the SRS resource is applicable to the multiple OFDM symbols as a single unit.

Aspect 5: The method of any of Aspects 1-4, wherein transmitting the plurality of SRSs comprises: transmitting, in the single frequency hop of the frequency hopping pattern, the plurality of SRSs and one or more repetitions of the plurality of SRSs in the SRS resource.

Aspect 6: The method of Aspect 5, wherein the frequency hopping pattern is a function of a count of a quantity of SRS transmissions, and the plurality of SRSs and the one or more repetitions of the plurality of SRSs are counted as a single SRS transmission.

Aspect 7: The method of any of Aspects 1-6, wherein the frequency hopping pattern is a function of a count of a quantity of SRS transmissions, and the count of the quantity of SRS transmissions is scaled by a quantity of the multiple OFDM symbols.

Aspect 8: The method of any of Aspects 1-7, wherein transmitting the plurality of SRSs comprises: transmitting, in a first frequency hop of the frequency hopping pattern, the plurality of SRSs on the multiple antenna ports in first multiple OFDM symbols of the SRS resource, and wherein the method further comprises: transmitting, in a second frequency hop of the frequency hopping pattern, additional SRSs on the multiple antenna ports in second OFDM symbols of the SRS resource.

Aspect 9: The method of any of Aspects 1-8, wherein transmitting the plurality of SRSs comprises: transmitting, in a first frequency hop of the frequency hopping pattern, the plurality of SRSs on the multiple antenna ports in first multiple OFDM symbols of a first occasion of the SRS resource, and wherein the method further comprises: transmitting, in a second frequency hop of the frequency hopping pattern, the plurality of SRSs on the multiple antenna ports in second multiple OFDM symbols of a second occasion of the SRS resource.

Aspect 10: A method of wireless communication performed by a network node, comprising: transmitting configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and receiving, in a single frequency hop of a frequency hopping pattern, a plurality of SRSs on the multiple antenna ports in the multiple OFDM symbols of the SRS resource.

Aspect 11: The method of Aspect 10, wherein the frequency hopping pattern is a function of a count of a quantity of SRS transmissions, and the count of the quantity of SRS transmissions is based at least in part on the multiple OFDM symbols being counted as a single OFDM symbol.

Aspect 12: The method of any of Aspects 10-11, wherein the frequency hopping pattern is a function of a count of a quantity of SRS transmissions, and the plurality of SRSs in the multiple OFDM symbols are counted as a single SRS transmission.

Aspect 13: The method of any of Aspects 10-12, wherein a repetition factor for the SRS resource is applicable to the multiple OFDM symbols as a single unit.

Aspect 14: The method of any of Aspects 10-13, wherein receiving the plurality of SRSs comprises: receiving, in the single frequency hop of the frequency hopping pattern, the plurality of SRSs and one or more repetitions of the plurality of SRSs in the SRS resource.

Aspect 15: The method of Aspect 14, wherein the frequency hopping pattern is a function of a count of a quantity of SRS transmissions, and the plurality of SRSs and the one or more repetitions of the plurality of SRSs are counted as a single SRS transmission.

Aspect 16: The method of any of Aspects 10-15, wherein the frequency hopping pattern is a function of a count of a quantity of SRS transmissions, and the count of the quantity of SRS transmissions is scaled by a quantity of the multiple OFDM symbols.

Aspect 17: The method of any of Aspects 10-16, wherein receiving the plurality of SRSs comprises: receiving, in a first frequency hop of the frequency hopping pattern, the plurality of SRSs on the multiple antenna ports in first multiple OFDM symbols of the SRS resource, and wherein the method further comprises: receiving, in a second frequency hop of the frequency hopping pattern, the plurality of SRSs on the multiple antenna ports in second multiple OFDM symbols of the SRS resource.

Aspect 18: The method of any of Aspects 10-17, wherein receiving the plurality of SRSs comprises: receiving, in a first frequency hop of the frequency hopping pattern, the plurality of SRSs on the multiple antenna ports in first multiple OFDM symbols of a first occasion of the SRS resource, and wherein the method further comprises: receiving, in a second frequency hop of the frequency hopping pattern, the plurality of SRSs on the multiple antenna ports in second multiple OFDM symbols of a second occasion of the SRS resource.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

Aspect 24: A method of wireless communication performed by a user equipment (UE), comprising: receiving configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and transmitting a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Aspect 25: The method of Aspect 24, wherein the count of the quantity of SRS transmissions is based at least in part on the multiple OFDM symbols being counted as a single OFDM symbol.

Aspect 26: The method of any of Aspects 24-25, wherein the plurality of SRSs in the multiple OFDM symbols are counted as a single SRS transmission.

Aspect 27: The method of any of Aspects 24-26, wherein a repetition factor for the SRS resource is applicable to the multiple OFDM symbols as a single unit.

Aspect 28: The method of any of Aspects 24-27, wherein transmitting the plurality of SRSs comprises: transmitting, in a single frequency hop of the frequency hopping pattern, the plurality of SRSs and one or more repetitions of the plurality of SRSs in the SRS resource.

Aspect 29: The method of Aspect 28, wherein the plurality of SRSs and the one or more repetitions of the plurality of SRSs are counted as a single SRS transmission.

Aspect 30: The method of any of Aspects 24-29, wherein transmitting the plurality of SRSs comprises: transmitting, in a first frequency hop of the frequency hopping pattern, the plurality of SRSs on the multiple antenna ports in first multiple OFDM symbols of the SRS resource, and wherein the method further comprises: transmitting, in a second frequency hop of the frequency hopping pattern, additional SRSs on the multiple antenna ports in second OFDM symbols of the SRS resource.

Aspect 31: The method of any of Aspects 24-30, wherein transmitting the plurality of SRSs comprises: transmitting, in a first frequency hop of the frequency hopping pattern, the plurality of SRSs on the multiple antenna ports in first multiple OFDM symbols of a first occasion of the SRS resource, and wherein the method further comprises: transmitting, in a second frequency hop of the frequency hopping pattern, the plurality of SRSs on the multiple antenna ports in second multiple OFDM symbols of a second occasion of the SRS resource.

Aspect 32: A method of wireless communication performed by a network node, comprising: transmitting configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and receiving a plurality of SRSs on the multiple antenna ports in the multiple OFDM symbols of the SRS resource using a frequency hopping pattern that is a function of a count of a quantity of SRS transmissions, and the count of the quantity of SRS transmissions is scaled by a quantity of the multiple OFDM symbols.

Aspect 33: The method of Aspect 32, wherein the count of the quantity of SRS transmissions is based at least in part on the multiple OFDM symbols being counted as a single OFDM symbol.

Aspect 34: The method of any of Aspects 32-33, wherein the plurality of SRSs in the multiple OFDM symbols are counted as a single SRS transmission.

Aspect 35: The method of any of Aspects 32-34, wherein a repetition factor for the SRS resource is applicable to the multiple OFDM symbols as a single unit.

Aspect 36: The method of any of Aspects 32-35, wherein receiving the plurality of SRSs comprises: receiving, in a single frequency hop of the frequency hopping pattern, the plurality of SRSs and one or more repetitions of the plurality of SRSs in the SRS resource.

Aspect 37: The method of Aspect 36, wherein the plurality of SRSs and the one or more repetitions of the plurality of SRSs are counted as a single SRS transmission.

Aspect 38: The method of any of Aspects 32-37, wherein receiving the plurality of SRSs comprises: receiving, in a first frequency hop of the frequency hopping pattern, the plurality of SRSs on the multiple antenna ports in first multiple OFDM symbols of the SRS resource, and wherein the method further comprises: receiving, in a second frequency hop of the frequency hopping pattern, the plurality of SRSs on the multiple antenna ports in second multiple OFDM symbols of the SRS resource.

Aspect 39: The method of any of Aspects 32-38, wherein receiving the plurality of SRSs comprises: receiving, in a first frequency hop of the frequency hopping pattern, the plurality of SRSs on the multiple antenna ports in first multiple OFDM symbols of a first occasion of the SRS resource, and wherein the method further comprises: receiving, in a second frequency hop of the frequency hopping pattern, the plurality of SRSs on the multiple antenna ports in second multiple OFDM symbols of a second occasion of the SRS resource.

Aspect 40: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-39.

Aspect 41: An apparatus for wireless communication at a device, the apparatus comprising one or more memories and one or more processors coupled to the one or more memories, the one or more processors configured to cause the device to perform the method of one or more of Aspects 1-39.

Aspect 42: An apparatus for wireless communication, the apparatus comprising at least one means for performing the method of one or more of Aspects 1-39.

Aspect 43: A non-transitory computer-readable medium storing code for wireless communication, the code comprising instructions executable by one or more processors to perform the method of one or more of Aspects 1-39.

Aspect 44: A non-transitory computer-readable medium storing a set of instructions for wireless communication, the set of instructions comprising one or more instructions that, when executed by one or more processors of a device, cause the device to perform the method of one or more of Aspects 1-39.

Aspect 45: A device for wireless communication, the device comprising a processing system that includes one or more processors and one or more memories coupled with the one or more processors, the processing system configured to cause the device to perform the method of one or more of Aspects 1-39.

Aspect 46: An apparatus for wireless communication at a device, the apparatus comprising one or more memories and one or more processors coupled to the one or more memories, the one or more processors individually or collectively configured to cause the device to perform the method of one or more of Aspects 1-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and
      transmit a plurality of SRSs on the multiple antenna ports in the multiple OFDM symbols of the SRS resource using a frequency hopping pattern that is a function of a count of a quantity of SRS transmissions, wherein the count of the quantity of SRS transmissions is based at least in part on the multiple OFDM symbols being counted as a single OFDM symbol, and the count of the quantity of SRS transmissions is scaled by a quantity of the multiple OFDM symbols.

2. The apparatus of claim 1, wherein the plurality of SRSs in the multiple OFDM symbols are counted as a single SRS transmission.

3. The apparatus of claim 1, wherein a repetition factor for the SRS resource is applicable to the multiple OFDM symbols as a single unit.

4. The apparatus of claim 1, wherein the one or more processors, to transmit the plurality of SRSs, are configured to:

transmit, in a single frequency hop of the frequency hopping pattern, the plurality of SRSs and one or more repetitions of the plurality of SRSs in the SRS resource.

5. The apparatus of claim 4, wherein the plurality of SRSs and the one or more repetitions of the plurality of SRSs are counted as a single SRS transmission.

6. The apparatus of claim 1, wherein the one or more processors, to transmit the plurality of SRSs, are configured to:

transmit, in a first frequency hop of the frequency hopping pattern, the plurality of SRSs on the multiple antenna ports in first multiple OFDM symbols of the SRS resource, and wherein the one or more processors are further configured to:

transmit, in a second frequency hop of the frequency hopping pattern, additional SRSs on the multiple antenna ports in second OFDM symbols of the SRS resource.

7. The apparatus of claim 1, wherein the one or more processors, to transmit the plurality of SRSs, are configured to:

transmit, in a first frequency hop of the frequency hopping pattern, the plurality of SRSs on the multiple antenna ports in first multiple OFDM symbols of a first occasion of the SRS resource, and wherein the one or more processors are further configured to:

transmit, in a second frequency hop of the frequency hopping pattern, the plurality of SRSs on the multiple antenna ports in second multiple OFDM symbols of a second occasion of the SRS resource.

8. An apparatus for wireless communication at a network node, comprising:

a memory; and one or more processors, coupled to the memory, configured to:

transmit configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and receive a plurality of SRSs on the multiple antenna ports in the multiple OFDM symbols of the SRS resource using a frequency hopping pattern that is a function of a count of a quantity of SRS transmissions, wherein the count of the quantity of SRS transmissions is based at least in part on the multiple OFDM symbols being counted as a single OFDM symbol, and the count of the quantity of SRS transmissions is scaled by a quantity of the multiple OFDM symbols.

9. The apparatus of claim 8, wherein the plurality of SRSs in the multiple OFDM symbols are counted as a single SRS transmission.

10. The apparatus of claim 8, wherein a repetition factor for the SRS resource is applicable to the multiple OFDM symbols as a single unit.

11. The apparatus of claim 8, wherein the one or more processors, to receive the plurality of SRSs, are configured to:

receive, in a single frequency hop of the frequency hopping pattern, the plurality of SRSs and one or more repetitions of the plurality of SRSs in the SRS resource.

12. The apparatus of claim 11, wherein the plurality of SRSs and the one or more repetitions of the plurality of SRSs are counted as a single SRS transmission.

13. The apparatus of claim 8, wherein the one or more processors, to receive the plurality of SRSs, are configured to:

receive, in a first frequency hop of the frequency hopping pattern, the plurality of SRSs on the multiple antenna ports in first multiple OFDM symbols of the SRS resource, and wherein the one or more processors are further configured to:

receive, in a second frequency hop of the frequency hopping pattern, the plurality of SRSs on the multiple antenna ports in second multiple OFDM symbols of the SRS resource.

14. The apparatus of claim 8, wherein the one or more processors, to receive the plurality of SRSs, are configured to:

receive, in a first frequency hop of the frequency hopping pattern, the plurality of SRSs on the multiple antenna ports in first multiple OFDM symbols of a first occasion of the SRS resource, and wherein the one or more processors are further configured to:

receive, in a second frequency hop of the frequency hopping pattern, the plurality of SRSs on the multiple antenna ports in second multiple OFDM symbols of a second occasion of the SRS resource.

15. A method of wireless communication performed by a user equipment (UE), comprising:

receiving configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and transmitting a plurality of SRSs on the multiple antenna ports in the multiple OFDM symbols of the SRS resource using a frequency hopping pattern that is a function of a count of a quantity of SRS transmissions, wherein the count of the quantity of SRS transmissions is based at least in part on the multiple OFDM symbols being counted as a single OFDM symbol, and the count of the quantity of SRS transmissions is scaled by a quantity of the multiple OFDM symbols.

16. The method of claim 15, wherein the plurality of SRSs in the multiple OFDM symbols are counted as a single SRS transmission.

17. The method of claim 15, wherein a repetition factor for the SRS resource is applicable to the multiple OFDM symbols as a single unit.

18. The method of claim 15, wherein transmitting the plurality of SRSs comprises:

transmitting, in a single frequency hop of the frequency hopping pattern, the plurality of SRSs and one or more repetitions of the plurality of SRSs in the SRS resource.

19. The method of claim 18, wherein the plurality of SRSs and the one or more repetitions of the plurality of SRSs are counted as a single SRS transmission.

20. The method of claim 15, wherein transmitting the plurality of SRSs comprises:

transmitting, in a first frequency hop of the frequency hopping pattern, the plurality of SRSs on the multiple antenna ports in first multiple OFDM symbols of the SRS resource, and wherein the method further comprises:

transmitting, in a second frequency hop of the frequency hopping pattern, additional SRSs on the multiple antenna ports in second OFDM symbols of the SRS resource.

21. The method of claim 15, wherein transmitting the plurality of SRSs comprises:

transmitting, in a first frequency hop of the frequency hopping pattern, the plurality of SRSs on the multiple antenna ports in first multiple OFDM symbols of a first occasion of the SRS resource, and wherein the method further comprises:

transmitting, in a second frequency hop of the frequency hopping pattern, the plurality of SRSs on the multiple antenna ports in second multiple OFDM symbols of a second occasion of the SRS resource.

22. A method of wireless communication performed by a network node, comprising:

transmitting configuration information indicating a sounding reference signal (SRS) resource set that includes an SRS resource, the SRS resource associated with multiple antenna ports and the multiple antenna ports having a distributed mapping to multiple orthogonal frequency division multiplexing (OFDM) symbols of the SRS resource; and receiving a plurality of SRSs on the multiple antenna ports in the multiple OFDM symbols of the SRS resource using a frequency hopping pattern that is a function of a count of a quantity of SRS transmissions, wherein the count of the quantity of SRS transmissions is based at least in part on the multiple OFDM symbols being counted as a single OFDM symbol, and the count of the quantity of SRS transmissions is scaled by a quantity of the multiple OFDM symbols.

23. The method of claim 22, wherein the plurality of SRSs in the multiple OFDM symbols are counted as a single SRS transmission.

24. The method of claim 22, wherein a repetition factor for the SRS resource is applicable to the multiple OFDM symbols as a single unit.

25. The method of claim 22, wherein receiving the plurality of SRSs comprises:

receiving, in a single frequency hop of the frequency hopping pattern, the plurality of SRSs and one or more repetitions of the plurality of SRSs in the SRS resource.

26. The method of claim 25, wherein the plurality of SRSs and the one or more repetitions of the plurality of SRSs are counted as a single SRS transmission.

27. The method of claim 22, wherein receiving the plurality of SRSs comprises receiving, in a first frequency hop of the frequency hopping pattern, the plurality of SRSs on the multiple antenna ports in first multiple OFDM symbols of the SRS resource.

28. The method of claim 27, further comprising receiving, in a second frequency hop of the frequency hopping pattern, the plurality of SRSs on the multiple antenna ports in second multiple OFDM symbols of the SRS resource.

29. The method of claim 22, wherein receiving the plurality of SRSs comprises receiving, in a first frequency hop of the frequency hopping pattern, the plurality of SRSs on the multiple antenna ports in first multiple OFDM symbols of a first occasion of the SRS resource.

30. The method of claim 29, further comprising receiving, in a second frequency hop of the frequency hopping pattern, the plurality of SRSs on the multiple antenna ports in second multiple OFDM symbols of a second occasion of the SRS resource.

* * * * *